United States Patent Office 3,218,309
Patented Nov. 16, 1965

3,218,309
AZO COMPOUNDS
Edward F. Elslager, Donald F. Worth, David B. Capps, Leslie M. Werbel, and Franklin W. Short, Ann Arbor, Mich., assignors to Parke, Davis & Company, Detroit, Mich., a corporation of Michigan
No Drawing. Filed Aug. 14, 1961, Ser. No. 131,110
The portion of the term of the patent subsequent to June 30, 1981, has been disclaimed
6 Claims. (Cl. 260—152)

This invention relates to azo compounds, to acid-addition salts thereof, and to methods for obtaining the same. More particularly, the invention relates to novel N,N-dialkyl-N'-(1-arylazo-4-naphthyl) - alkylenediamine compounds and acid-addition salts thereof.

The novel N,N-dialkyl-N'-(1-arylazo-4-naphthyl)-alkylenediamine compounds with which the present invention is concerned have in their free base form of the formula

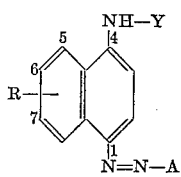

where Y represents a radical of the formula

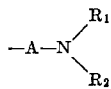

or a radical of the formula

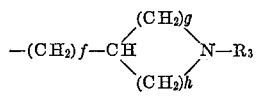

A represents an alkylene radical containing between 2 and 8 carbon atoms inclusive, or an alkylene radical containing more than 2 and less than 7 carbon atoms in which one of the methylene groups not attached to the nitrogen atoms is replaced by —O—, —S—, =CHOH, =COH(lower alkyl), =N(lower alkyl) or =CH(di-lower alkylaminoalkyl); R represents hydrogen, methyl, methoxy, or ethoxy radical or a chlorine or bromine atom, said R group being attached to the 5th, 6th, or 7th positions of the naphthalene nucleus; $R_1$ and $R_2$ each represents an alkyl radical, a cycloalkyl radical, a hydroxyalkyl radical, or an alkoxyalkyl radical, said radicals containing fewer than 7 carbon atoms, the allyl or methallyl radicals, or a lower dialkylaminoalkyl radical containing 3 to 7 carbon atoms inclusive, or in combination with —N< represents a saturated heterocyclic ring containing from 4 to 12 carbon atoms inclusive such as pyrrolidine, piperidine, hexamethyleneimine, morpholine, piperazine, homopiperazine, decahydroquinoline, decahydroisoquinoline, azabicyclooctane, azabicyclononane, azabicyclodecane, hexahydroindoline, octahydroquinazoline, hexahydropyrrolizine, octahydropyridopyrimidine, or octahydropyridopyrazine ring, said heterocyclic ring optionally bearing lower alkyl, lower hydroxyalkyl, lower alkoxyalkyl, hydroxy, lower alkoxy, amino, or lower dialkylaminoalkyl substituents; $f$ represents an integer from 0 to 3 inclusive, $g$ and $h$ represent integers such that $g+h=3$ or 4; $R_3$ represents a lower alkyl, lower hydroxyalkyl, lower alkoxyalkyl, or a lower dialkylaminoalkyl radical; and Ar represents an aromatic carbocyclic group of the benzene naphthalene, tetrahydronaphthalene, dihydronaphthalene, or indane series which has the connecting valence on a ring carbon atom and which may have one or more ring hydrogens replaced by a substituent such as an arsenoso, arsono, bromo, chloro, cyano, fluoro, iodo, keto, mercapto, phosphono, stibono, sulfo, trifluoromethyl, or nitro radical; an amino radical containing from 0 to 9 carbon atoms inclusive; a sulfonamido radical containing from 2 to 9 carbon atoms inclusive; an aminoalkyl, carbamyl, dithio, hydroxyalkyl, sulfinyl, sulfonyl, thio, or ureylene radical containing from 1 to 9 carbon atoms inclusive; an alkyl or heterocyclic radical containing from 1 to 15 carbon atoms inclusive; an acyl, acylamido, alkoxyalkoxy, aminoalkoxy, or hydroxyalkoxy radical containing from 2 to 9 carbon atoms inclusive; an azo, carbalkoxy or heterocyclic radical containing from 2 to 12 carbon atoms inclusive; an aralkyl, aroyl, aryl, arylamido, or aryloxy radical containing from 6 to 8 carbon atoms inclusive; an arylamidoalkoxy, aryloxyalkoxy, or arylsulfonamido alkoxy radical containing from 11 to 16 carbon atoms inclusive; or a bis-(aminophenyl)-methyl, bis-(aminophenyl)-carbinol or bis-(aminophenyl)-carbonium radical containing from 13 to 14 carbon atoms inclusive.

The product of the invention can be prepared by coupling an alpha-naphthylamine having in free base form the formula

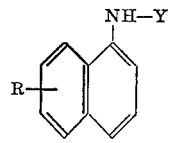
(1)

with a diazonium compound of the formula

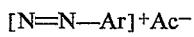

In the above formula Ac⁻ represents the anion of an acid or the OH⁻ ion and R, Y, and Ar have the same meaning as given above. Preferably, the reaction is conducted under acidic conditions (pH=7), although, if desired, basic conditions can be employed. In carrying out this condensation it is generally satisfactory to employ substantially equivalent quantities of the reactants in the presence of a suitable solvent. Suitable solvents for the reaction are aqueous mixtures of water-miscible aliphatic alcohols, such as methanol, ethanol and propanol, tetrahydrofuran, N,N-dimethylacetamide, N,N-dimethylformamide, a simple organic acid such as formic acid, acetic acid, propionic acid and the like; or the acid furnishing the anion represented by Ac⁻. Where is is desired to carry out the reaction at a controlled pH, a suitable buffer system may be employed. In general, the time and the temperature of the reaction are not critical; however, heating is to be avoided, and a temperature less than 15° C. is generally preferred.

The diazonium compounds of the above formula can be conveniently prepared in situ, by the reaction of an amine of the formula $H_2N$—Ar with an alkali nitrite such as e.g. sodium nitrite in an acid medium (pH<7) or by other methods known to organic chemists, and added to the coupling reaction mixture containing the desired α-naphthylamine of Formula I.

The α-naphthlyamines of the Formula I employed as starting materials in this reaction can be prepared in various ways. For example, they can be prepared by aminoalkylation of an α-naphthylamine of the formula

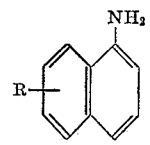

or an alkali metal salt thereof with an aminoalkylating agent of the formula

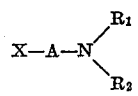

or of the formula

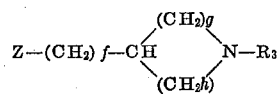

wherein X represents a halogen atom or the

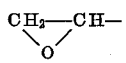

group; Z represents a halogen atom, and A, R, $R_1$, $R_2$, $R_3$, $f$, $g$, and $h$ have the aforementioned significance. The reaction proceeds readily in a solvent medium. Suitable solvents for the reaction are benzene, toluene, and the like. Where the free base form is employed the reaction is preferably conducted in the presence of a base such as an alkali-metal carbonate, for example, potassium carbonate.

α-Naphthylamines of Formula I can also be prepared by the reduction of a Schiff base having the formula

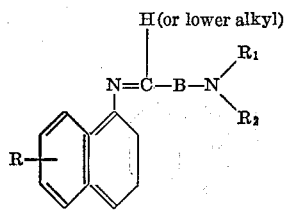

The reduction can be conveniently effected by hydrogenation in the presence of a noble metal catalyst, such as e.g. 20% palladium on charcoal. The Schiff bases of the above formula can be readily prepared by condensation of an amino-aldehyde or ketone of the formula

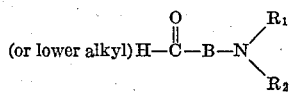

and an α-naphthylamine of the formula

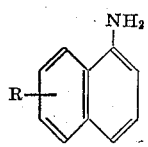

in a solvent medium. Suitable solvents for the reaction are benzene, toluene and the like. The reaction is favored by an acid catalyst such as e.g. p-toluenesulfonic acid, and by temperatures in excess of 50° C. and is preferably carried out between 50 and 150° C. The Schiff bases so formed can be reduced catalytically without isolation or purification from the reaction mixture. In the above formulas R, $R_1$ and $R_2$ have the aforementioned significance and B represents an alkylene radical containing between 2 and 7 carbon atoms inclusive, or an alkylene radical containing more than 2 and less than 6 carbon atoms in which one of the methylene groups not attached to the nitrogen atoms is replaced by —O—, —S—, =CHOH, =CH(dialkylaminoalkyl) or =N-(lower alkyl).

Additionally, the α-naphthylamines of Formula I can be prepared by a replacement reaction between a compound of the formula

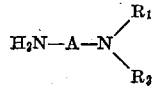

or of the formula

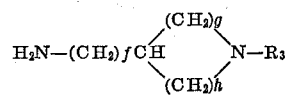

and the hydroxyl group on a α-napthol of the formula

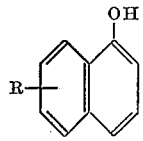

The reaction is favored by temperatures of 100–175° C. and is preferably carried out in a sealed container in an aqueous medium and in the presence of an agent such as sulfur dioxide, sodium bisulfite or sodium hydrosulfite. In the above formulas A, R, $R_1$, $R_2$, $R_3$, $f$, $g$, and $h$ have the aforementioned significance.

The compounds of the invention can also be produced by hydrolysis of a compound of the formula

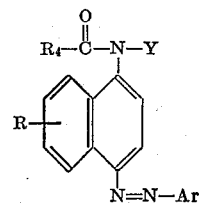

wherein the group

is particularly susceptible to hydrolytic cleavage by acidic or basic hydrolytic agents under mild conditions. In the above formulas $R_4$ represents the hydrogen atom or a perhaloalkyl radical such as e.g. —$CF_3$, and R, Y, and Ar have the aforementioned significance. Where $R_4$ represents a perhaloalkyl radical, the hydrolysis is preferably effected by dissolving the starting material in a water-miscible inert organic solvent such as methanol, adding an aqueous solution of an alkali metal hydroxide, conveniently an aqueous solution of sodium or potassium hydroxide having a normality of about 1 to 3, and allowing the reaction mixture to stand (with or without stirring) at about room temperature until the reaction is completed. Where $R_4$ represents the hydrogen atom, hydrolysis is preferably conducted in the presence of a mineral acid such as e.g. hydrochloric acid under similar reaction conditions.

The amides employed as starting materials in this process are novel per se and can be prepared by a process which comprises acylation of a nitro compound having the formula

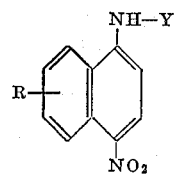

with an acid of the formula

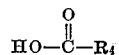

or a functional derivative thereof to yield an amide of the formula

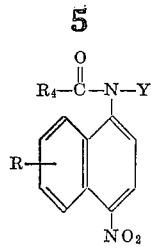

subjecting said amide to hydrogenation in the presence of a catalyst such as e.g. Raney nickel to yield an amino compound of the formula

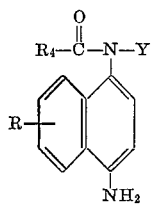

converting the said amino compound to a diazonium compound, and coupling the said diazonium compound with a suitable aromatic carbocyclic compound. In the above formulas Y, R and $R_4$ have the aforementioned significance. Where $R_4$ represents the perhaloalkyl group such as e.g. trifluoromethyl, the acylation reaction is conveniently effected by employing the acid anhydride in a solvent medium such as e.g. N,N-dimethylformamide. Where $R_4$ represents a hydrogen atom, acylation is preferably effected using a formic acid-aceticanhydride mixture. Acylation with the latter agent is favored by increased temperatures, preferably between 50–125° C., whereas the acylation using the perhaloalkanoic acid anhydride proceeds readily at about 25–50° C.

The conversion of the free —$NH_2$ group to the diazonium salt proceeds readily under mild acidic conditions in the presence of an alkali nitrite such as e.g. sodium nitrite, preferably at a temperature under 15° C. The coupling of the diazonium salt and the aromatic carbocyclic component can be effected under basic or acidic conditions. In general, where the aromatic carbocyclic component is acid-sensitive, the formamide derivative is employed and the coupling conducted under neutral or basic conditions (pH≧7). Where the aromatic carbocyclic component is alkali-sensitive, the coupling reaction is preferably conducted under acidic conditions (pH≦7) and a perhaloalkanoylamide derivative, preferably the trifluoroacetamide derivative, is employed. The time and temperature of the coupling reaction are not critical, however, best results are obtained when the reaction is allowed to proceed at a temperature less than 15° C. Preferred solvent for the reaction is water or aqueous mixtures of water-miscible alcohols such as methanol, ethanol, propanol and the like. If desired, after the coupling reaction has proceeded to completion the azo-amide compounds can be hydrolyzed to the azo products of the invention without isolation or purification by adjusting the pH and temperature of the mixture to the preferred range.

The compounds of the invention possess valuable antiparasitic properties. More particularly, the compounds are lethal for Schistosoma mansoni, a causative agent of schistosomiasis, and are effective in combatting schistosomiasis infections in rodents to primates. When administered in feed, the azo compounds are also useful in eliminating trichostrongyles, tapeworms and ascarids from mouse breeding colonies. They are also effective against round-worm species in cattle. When formulations containing the claimed compounds are applied to nymphs of the Lone Star tick, 100% mortality of these parasites is frequently observed. Certain compounds are also effective as stomach poison plant insecticides, and provide 100% control of plants infested with the southern armyworm larva. The compounds of the invention inhibit the growth of important fungi such as Candida albicans, Cryptococcus neoformans, Histoplasma capsulatum, Nocardia asteroides, and Trichophyton interdigitale and are valuable intermediates for use in the preparation of other chemical compounds that possess valuable antiparasitic and chemotherapeutic properties. For example, the compounds can be reduced to provide N-(dialkylaminoalkyl)-1,4-naphthalenediamines as described in the co-pending application of Edward F. Elslager and Donald F. Worth, Serial No. 131,111, filed August 14, 1961, and now abandoned.

The free bases encompassed in this application can also be employed in the form of their acid-addition salts which are formed by reaction of the free bases with a variety of inorganic and organic acids. Some examples of the many organic and inorganic acids which can be used to produce the corresponding non-toxic acid-addition salts are hydrochloric, hydrobromic, hydriodic, sulfuric, phosphoric, oxalic, cholic, sulfamic, naphthalene-1,5-disulfonic, phenoxyacetic, lactic, tartaric, gluconic, alginic, citric, succinic, maleic, malonic, adipic, mandelic, oleic, tannic, ethylsulfuric, penicillinic, benzoic, 5,5'-naphthalenedisalicyclic, 3- and 5-phenylsalicyclic, 3-hydroxy-2-naphthoic, 4,4'-methylenebis-(3-hydroxy - 2 - naphthoic), 1,4,5,8-naphthalenetetracarboxylic, 4-biphenylcarboxylic, terephthalic, pyromellitic, 8-hydroxy-7-iodo-5-quinolinesulfonic, cyclopentylpropionic, cyclohexanecarboxylic, arsanilic, arsonic acid and the like. Salts of the free bases of the invention with inorganic antimony derivatives such as e.g. antimony trichloride, and with compounds known to possess activity against schistosomiasis such as phthalic acid mono-4-(3'-chloro-4'-methylphenyl)-piperazide, maleic acid mono-4-(3'-chloro-4'-methylphenyl)-piperazide, pyridine-2,3-dicarboxylic acid mono-4 - (3'-chloro-4'-methylphenyl)-piperazide, succinic acid mono - 4 - (3'-chloro-4'-methylphenyl)-piperazide, oxalic acid mono-4-(3'-chloro-4'-methylphenyl)-piperazide, maleic acid mono-4-(3'-bromo-4'-methylphenyl)-piperazide, adipic acid mono - 4 - (3'-chloro-4'-methylphenyl)-piperazide, glutaric acid mono-4-(3'-chloro-4'-methylphenyl)-piperazide, terephthalic acid mono-4-(3'-chloro-4'-methylphenyl)-piperazide, diglycollic acid mono-4-(3'-chloro-4'-methylphenyl)-piperazide, N,N' - [heptamethylenebis-(oxy-p-phenylene)]-diglycine, N,N'-[heptamethylenebis-(oxy - p - phenylene)]-di-β-alanine, [heptamethylene-bis-(oxy-p-phenylenenitrilo)]-tetraacetic acid, and organic antimony derivatives such as 2-hydroxy-5-oxo-1,3,2-dioxastibiolane-4-glycolic acid, 2-(4,6-disulfo-1,3,2-benzodioxastibiol-2-yloxy)-1-phenyl-3,5-disulfonic acid, and antimony-2,3-dimercaptosuccinate are of particular interest.

The invention is illustrated, but not limited, by the following examples:

*Example 1*

A solution, prepared by combining 34.7 g. (0.20 mole) of sulfanilic acid, 34 ml. (0.20 mole) of 6 N sodium hydroxide solution, 250 ml. of water, and 200 ml. (0.20) mole of 1 M sodium nitrite solution, is cooled to 0° C., and added with stirring to a mixture of 50 ml. (0.60 mole) of concentrated hydrochloric acid and 500 ml. of an ice-water mixture. After stirring for 5 minutes, the suspension of the diazonium salt is added to a mixture of 48.6 g. (0.20 mole) of 1-(2-diethylaminoethylamino)-naphthalene, 100 ml. (1.20 moles) of concentrated hydrochloric acid, and 2 l. of an ice-water suspension. The deep purple suspension is stirred for 18 hours and allowed to warm up to room temperature. The precipitate is collected by filtration, washed with 0.5 N hydrochloric acid and dried in vacuo at 78° C. for 18 hours. After exposure to the atmosphere for 24 hours, the desired p-[4-(2-diethylaminoethylamino) - 1 - naphthylazo]-benzene-sulfonic acid, monohydrochloride, dihydrate is obtained as a purple-green solid, M.P. 200° C. (dec.).

The free base can be prepared as follows: The acid-washed filter cake is suspended in water and treated with 200 ml. of a 10 percent ammonium carbonate solution. The orange suspension thus obtained is collected by filtration, washed with water, suspended in methanol, filtered, washed with methanol and dried in vacuo at 60° C. The desired p-[4-(2-diethylaminoethylamino)-1-naphthylazo]-benzenesulfonic acid melts at 243–244° C. (dec.).

In like manner the following related compounds can be prepared, starting from an aminobenzenesulfonic acid and an equivalent quantity of the appropriate 1-(dialkylaminoalkylamino)naphthalene:

p-[4-(2 - dimethylaminoethylamino)-1-naphthylazo]benzenesulfonic acid, monohydrochloride, M.P. 193° C. (dec.)

o-[4-(2-diethylaminoethylamino) - 1 - naphthylazo]benzenesulfonic acid, ¾ hydrate, M.P. 185° C. (dec.)

m-[4-(2-diethylaminoethylamino) - 1 - naphthylazo]benzenesulfonic acid, sesquihydrate, M.P. 197–198° C. (dec.)

p-[4-(2-dibutylaminoethylamino) - 1 - naphthylazo]benzenesulfonic acid, monohydrochloride, dihydrate, M.P. 200–205° C.

p-[4-(2 - diethylaminoethylamino) - 6 - methoxy-1-naphthylazo]benzenesulfonic acid, sesquihydrate, M.P. 210° C. (dec.)

p-{4-[2-(1-pyrrolidinyl)ethylamino] - 1 - naphthylazo}-benzenesulfonic acid, monohydrochloride, 2½ hydrate, M.P. 207–210° C.

p-[4-(2-diisopropylaminoethylamino) - 1 - naphthylazo]-benzenesulfonic acid, monohydrochloride, sesquihydrate, M.P. 201–203° C.

p-{4-[2 - (ethylmethylamino)ethylamino] - 1 - naphthylazo}benzenesulfonic acid, monohydrochloride, 3½ hydrate, M.P. 189–205° C.

The starting material, 1-(2-diethylaminoethylamino) naphthalene, can be prepared as follows: a mixture of 572 g. (4 moles) of 1-naphthylamine, 690 g. (4 moles) of 2-diethylaminoethylchloride hydrochloride, 1250 g. (9 moles of anhydrous potassium carbonate, 3 l. of benzene and 20 g. of copper-bronze powder is stirred and boiled under reflux for 18 hours. The mixture is cooled and 5 l. of 5% sodium hydroxide and 1 l. of ether are added. The mixture is stirred vigorously for one-half hour, the layers are allowed to separate and the aqueous layer is siphoned off. The alkaline solution is extracted with several portions of ether, benzene or chloroform, and the combined organic extracts are added to the benzene-ether layer. The combined solvent mixture is washed twice with water, once with saturated sodium chloride solution and dried over anhydrous magnesium sulfate. The drying agent is collected by filtration and the filtrate concentrated in vacuo on the steam bath. Vacuum distillation of the residue through a 10-inch Vigreux column gives the desired 1-(2-diethylaminoethylamino) naphthalene as a pale yellow oil, B.P. 170–172° C./1.5 mm., $n_D^{25}$ 1.5903.

The other intermediate 1-(dialkylaminoalkylamino) naphthalenes can be prepared by the procedures described under Examples 1 through 15 herein.

*Example 2*

A solution of 5.3 g. (0.0136 mole) of N-(4-amino-1-naphthyl) - N-(2-diethylaminoethyl)-2,2,2-trifluoroacetamide, monohydrochloride in 50 ml. of ice and water containing 2.5 ml. (0.03 mole) of concentrated hydrochloric acid is treated with 13.6 ml. (0.0136 mole) of a 1 M aqueous solution of sodium nitrite over a period of 5 minutes. The red diazonium salt solution is stirred in an ice-bath for 5 minutes at 0–5° C. and poured into a stirred solution of 3.3 g. (0.0136 mole) of 1-(2-diethylaminoethylamino)naphthalene in 150 ml. of water and 7.5 g. (0.09 mole) of concentrated hydrochloric acid, maintaining the temperature at 5° C. The resulting purple mixture is stirred and allowed to warm to room temperature during 1 hr., whereupon it is treated with 170 ml. (0.17 mole) of 1 M aqueous sodium bicarbonate. The mixture is extracted with ether and the ether solution of N-(2-diethylaminoethyl)-N-{4-[4-(2-diethylaminoethylamino) - 1 - naphthylazo]-1-naphthyl}-2,2,2-trifluoroacetamide, of formula,

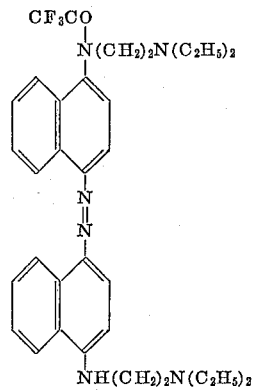

is washed with water, dried over anhydrous magnesium sulfate, and the ether removed in vacuo. This trifluoroacetamide possesses potent antischistosome activity per se. The iridescent residue is dissolved in 75 ml. of methanol, 25 ml. (0.05 mole) of 2 N methanolic sodium hydroxide is added, and the mixture stirred at room temperature for 1 hr. The maroon crystals that separate are collected by filtration, washed with cold methanol, and recrystallized twice from a hot mixture of ethanol and acetone. The desired N,N'-(azodi-1,4-naphthylene)-bis(N,N'-di-ethyl-ethylenediamine), of formula,

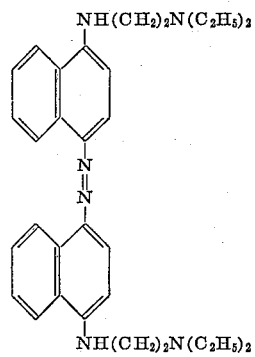

is thus obtained as brown needles, M.P. 163–165° C.

N - (4 - amino - 1-naphthyl)-N-(2-diethylaminoethyl)-2,2,2-trifluoroacetamide, monohydrochloride, employed as a starting material in the above procedure, is prepared as follows: a mixture of 46 g. (0.22 mole) of 1-chloro-4-nitronaphthalene and 77 g. (0.66 mole) of N,N-diethyl-ethylenediamine is heated on the steam bath until an exothermic reaction occurs. The temperature reaches 140° C., then drops slowly to 110° C., whereupon heating is resumed for 2 hours. The hot melt is poured with stirring into 750 ml. of water containing 35 ml. of concentrated ammonium hydroxide and ice. The aqueous phase is separated, the residue titurated with warm water, and the residue crystallized from 2-propanol. This is the desired intermediate, N,N-diethyl-N'-(4-nitro-1-naphthyl) ethylenediamine, yellow platelets, M.P. 80–81° C.

Subsequently, a solution of 13.5 g. of trifluoroacetic anhydride in 40 ml. of dimethylformamide is added to a stirred solution of 14.4 g. of N,N-diethyl-N'-(4-nitro-1-naphthyl)-ethylenediamine in 90 ml. of dimethylformamide over a period of 30 minutes. Stirring is continued for 1 hour and the reaction mixture is poured into 1 l. of ice and water containing 150 ml. of 1 M sodium bicarbonate solution. The mixture is extracted with three 2 l. portions of ether and the combined ether extracts are washed with water and dried over anhydrous magnesium sulfate. The dessicant is collected by filtration and the ether is removed in vacuo to give the desired intermediate N - (4 - nitro-1-naphthyl)-N-(2-diethylaminoethyl)-α,α,α-trifluoroacetamide as a viscous oil, which is used directly in the subsequent reaction without further purification.

The N-(2-diethylaminoethyl)-(4-nitro-1-naphthyl)-α,α,α-trifluoroacetamide (16 g.), is dissolved in 250 ml. of methanol and 40 ml. of 1 N methanolic hydrogen chloride and hydrogenated in the presence of 1 g. of Raney nickel catalyst at 25–35° C. under 25–55 p.s.i.g. of hydrogen. The catalyst is collected by filtration and the filtrate evaporated under reduced pressure to give a mushy crystalline residue which is diluted with ether, filtered, and the precipitate washed thoroughly with ether. Crystallization from ethanol gives the desired N-(2-diethylaminoethyl)-N-(4-amino-1-naphthyl)trifluoroacetamide, monohydrochloride as fine white needles, M.P. 216–218° C.

Alternatively, N-(4-amino-1-naphthyl)-N-(2-diethylaminoethyl)-2,2,2-trifluoroacetamide, monohydrochloride is prepared as follows: 93.1 g. (1.0 mole) of aniline is dissolved in 2 l. of water containing 250 ml. (3.0 moles) of concentrated hydrochloric acid. The solution is cooled to 0° C., and the amine diazotized by the portionwise addition of a solution of 69.0 g. (1.0 mole) of sodium nitrite in 300 ml. of water. This diazonium salt solution is then added slowly to a solution of 242 g. (1.0 mole) of 1-(2-diethylaminoethylamino)naphthalene in 4 l. of water containing 70 ml. (2.0 moles) of concentrated hydrochloric acid. In order to disperse the thick mush which forms near the end of the coupling, 4 additional liters of cold water are added to the reaction mixture. The temperature is maintained below 5° C. during both the diazotization and coupling reactions. After stirring at room temperature for 5 hours, the resulting deep purple reaction mixture is made alkaline by the addition of saturated sodium hydroxide solution, whereupon an orange tar separates. This is caused to solidify by trituration with cold, dilute sodium hydroxide. The product is collected by filtration, dried in vacuo at room temperature and then at 40° C., and crystallized from n-heptane to give shimmering red crystals of N,N-diethyl-N'-(4-phenylazo-1-naphthyl)ethylenediamine, M.P. 62° C. Subsequently, a solution of the crude dye (203.4 g., 0.59 mole) in 710 ml. of dimethylformamide is placed in a 2 l. flask and treated over a period of 1 hour with a solution of 147 g. (0.70 mole) of trifluoroacetic anhydride in 100 ml. of dimethylformamide with continuous stirring. During the addition, an exothermic reaction occurs, the temperature rising to 49° C. After standing at room temperature for 16 hours, the resulting mixture is poured into 2 l. of an ice-water mixture, and 800 ml. of 1 molar aqueous bicarbonate is cautiously added. The viscous dark red mass which separates is extracted from the cold aqueous medium with two 1 l. portions of benzene and the combined benzene extracts are washed successively with water and saturated sodium chloride solution and dried over anhydrous magnesium sulfate. The drying agent is collected by filtration and the benzene evaporated in vacuo on the steam bath. The residue is dissolved in 500 ml. of absolute methanol and 160 ml. of 4 N ethanolic hydrogen chloride is added, followed by 10 l. of anhydrous ether. The orange crystals of N-(2-diethylaminoethyl)-N-(4-phenylazo-1-naphthyl)trifluoroacetamide, monohydrochloride, which separate are collected by filtration, washed with ether and dried in vacuo; M.P. 206–208° C.

Eighty-eight grams (0.184 mole) of the above trifluoroacetamide are dissolved in 600 ml. of methanol and hydrogenolyzed in the presence of 5 g. of Raney nickel catalyst at 23–35° C. under 26–54 p.s.i.g. of hydrogen. The catalyst is collected by filtration and the filtrate evaporated under reduced pressure to give a mushy crystalline residue which is diluted with ether, filtered, and the precipitate washed thoroughly with ether. Crystallization from ethanol gives the desired N-(2-diethylaminoethyl)-N-(4-amino-1-naphthyl)trifluoroacetamide, monohydrochloride as fine white needles, M.P. 216–218° C.

Further, N,N''-(azodi-1,4-naphthylene)-bis-(N',N'-diethylethylenediamine) and related compounds can be prepared from N-(2-diethylaminoethyl)-N-(4-amino-1-naphthyl)formamide according to the following procedure: A mixture of 3.5 ml. of formic acid, 8.4 ml. of acetic anhydride, and 50 ml. of tetrahydrofuran is heated on the steam bath for two hours. Upon cooling, 5.74 g. (0.02 mole) of N,N-diethyl-N'-(4-nitro-1-naphthyl)ethylenediamine is added, and the resulting solution is stirred and heated under reflux for 24 hours. The solvent is removed in vacuo and the residue suspended in excess aqueous sodium hydroxide solution and extracted with ether. The ether extracts are dried over anhydrous sodium sulfate, the drying agent is collected by filtration, and the solvent removed in vacuo. The residual yellow oil is the desired intermediate, N-(2-diethylaminoethyl)-N-(4-nitro-1-naphthyl)formamide, which is used directly in the next step without further purification.

The above formyl derivative is subsequently dissolved in 300 ml. of methanol and hydrogenated at an initial hydrogen pressure of 44 p.s.i.g. in the presence of 1 g. of Raney nickel catalyst. The catalyst is collected by filtration and the solvent removed in vacuo. The residual oil is cooled to room temperature, dissolved in 2-propanol, and treated with a 2-propanolchloride mixture until precipitation is complete. The crude product is collected by filtration, washed with 2-propanol and dried in vacuo at 40° C. for 14 hours. Rapid crystallization from warm 2-propanol containing a slight excess of hydrogen chloride gives the intermediate N-(2-diethylaminoethyl)-N-(4-amino-1-naphthyl)formamide, dihydrochloride, 1½ hydrate, as a lavender solid, N.P. 130–140° C. (dec.), of formula

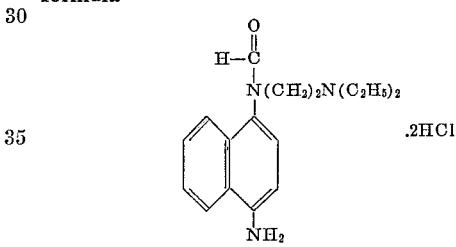

Subsequently, a cooled solution of 0.386 g. (0.0056 mole) of sodium nitrite in 50 ml. of water is added to a solution of 2.0 g. (0.0056 mole) of N-(2-diethylaminoethyl)-N-(4-amino-1-naphthyl)formamide, dihydrochloride in dilute hydrochloric acid. After a few minutes, the diazonium salt solution is added at 0–5° C. with stirring to a solution of 1.36 g. (0.0056 mole) of 1-(2-diethylaminoethylamino)naphthalene in 100 ml. of water and 1.2 ml. of concentrated hydrochloric acid. Stirring is continued for several minutes and the reaction mixture is made alkaline with sodium hydroxide solution. The red solid, which exhibits a green iridescence, is collected by filtration and dried in vacuo. This is the desired intermediate, of formula,

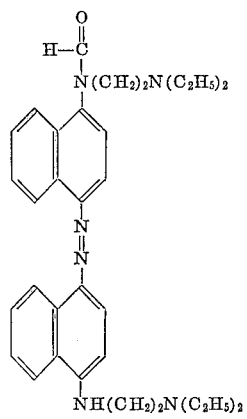

The intermediate N-(2-diethylaminoethyl)-N-{4-[4-(2-diethylaminoethylamino)-1-naphthylazo]-1-naphthyl}formamide is allowed to stand at room temperature for 18 hours in ethanolic hydrogen chloride. The mixture is concentrated and made alkaline with aqueous sodium hydroxide. The resulting maroon solid is collected by filtration, washed thoroughly with water, and crystallized from a mixture of ethanol and acetone. The brown crystals thus obtained, M.P. 162–164° C., are the desired N,N''-(azodi-1,4-naphthylene)-bis(N',N' - diethylethylenediamine).

Utilizing the experimental procedures described above, the following N-[4 - arylazo) - 1 - naphthyl]-N-(dialkylaminoalkylamino)amides can be prepared, starting from the appropriate 1-(dialkylaminoalkylamino)naphthalene.

N-(2-diethylaminoethyl)-N-{4-[4-(2-diethylaminoethylamino)-1-naphthylazo]-1-naphthyl}-acetamide, hydrochloride, hydrate, M.P. 116–153° C. dec.)

N-(2-diethylaminoethyl)-4-[4-(2-diethylaminoethylamino)-1-naphthylazo]-1-naphthalenecarbamic acid, ethyl ester, trihydrochloride, trihydrate, M.P. 94–120° C.

N-(2-diethylaminoethyl)-2,2,2-trifluoro-N-{4-{4-{[2-(isopropylmethylamino)ethyl]amino}-1-naphthylazo}-1-naphthyl}acetamide N-(2-diethylaminoethyl)-N-{4-{-4-{[2-(1-pyrrolidinyl)-ethyl}amino}-1-naphthylazo}-1-naphthyl}-2,2,2-trifluoroacetamide N-(3-diethylamino-2,2-dimethylpropyl)-N-{4-{4-[(3-diethylamino-2,2-dimethylpropyl)amino]-1-naphthylazo}-1-naphthyl}-2,2,2-trifluoroacetamide N-(2-diethylaminoethyl)-N-{4-{4-[(2-diethylaminoethyl)amino]-6-methoxy-1 - naphthylazo}-1-naphthyl}-2,2,2-trifluoroacetamide 2,2,2-trifluoro-N-(3-piperidinopropyl)-N-{4-{4-[(3-piperidinoproyl)amino]-1-naphthylazo}-1-naphthyl}acetamide 2,2,2-trifluoro-N-[2-(isopropylmethylamino)ethyl]-N-{4-{4-{[2-isopropylmethylamino)ethylamino}-1-naphthylazo}-1-naphthyl} acetamide N-(2-diethylaminoethyl)-N-{4-{4-{{2-[ethyl(2-hydroxyethyl)amino]ethyl}amino}-1-naphthylazo}-1-naphthyl}2,2,2-trifluoroacetamide N-(2-diisopropylaminoethyl)-2,2,2-trifluoro-N-{4-{4-{[2-(isopropylmethylamino)ethyl]amino}-1-naphthylazo}-1-naphthyl}acetamide Hydrolysis of these amides according to the procedures described above gives the following N,N''-(azodi-1,4-naphthylene)-bis(N',N'-dialkylalkylenediamines):

N,N-diethyl-N''-isopropyl-N''-methyl-N',N''-(azodi-1,4-naphthylene)bisethylenediamine, M.P. 149–151° C.
1-{2-{{4-{4-[(2-diethylaminoethyl)amino]-1-naphthyl}amino}ethyl}pyrrolidine
N,N''-(azodi-1,4-naphthylene)bis[N',N'-diethyl-2,2-dimethyl-2,3-propanediamine]
N'-{4-{4-(2-diethylaminoethyl)amino]-7-methoxy-1-naphthylazo}-1-naphthyl}N,N-diethylethylenediamine
1,1'-[azobis(1,4-naphthyleneiminotrimethylene)]-dipiperidine
N,N''-(azodi-1,4-naphthylene)bis[N'-isopropyl-N'-methylethylenediamine]
2-{{2-{{4-{4-[(2-diethylaminoethyl)amino]-1-naphthylazo}-1-naphthyl}amino}ethyl}ethylamino}ethanol
N,N,N'''-triisopropyl-N''-methyl-N',N'''-(azodi-1,4-naphthylene)bisethylenediamine The other substituted 1-naphthylamines employed herein are prepared according to the procedures under Examples 1 through 15.

*Example 3*

A mixture of 9.3 g. (0.10 mole) of aniline, 21 ml. (0.25 mole of concentrated hydrochloric acid, 100 ml. of water, and 100 g. of ice is treated dropwise at 0° C. with a solution of 6.9 g. (0.10 mole) of sodium nitrite in 100 ml. of water. The resulting benzenediazonium chloride solution is poured slowly into a stirred solution of 32.8 g. (0.10 mole) of 1,1-diisopropyl-4-methyl-7-(1-naphthyl)diethylenetriamine in 500 ml. of water containing 17.5 ml. (0.21 mole) of concentrated hydrochloric acid while maintaining the temperature at 0–5° C. The resulting purple solution is stirred for 3 hrs. at 0–5° C. and allowed to warm to 25° C. The mixture is made alkaline with 10% aqueous sodium hydroxide, extracted with chloroform, and the combined chloroform extracts dried over anhydrous potassium carbonate. The drying agent is collected by filtration, the chloroform is removed in vacuo, and the residue dissolved in 2-propanol. Upon the addition of an excess of a hydrogen chloride-2-propanol mixture, a crystalline material separate which is collected by filtration and crystallized from an ethanol-ether mixture. The dark blue crystals thus obtained are the desired 1,1-diisopropyl-4-methyl-7-(4-phenylazo-1-naphthyl)diethylenetriamine, trihydrochloride, hydrate, of formula,

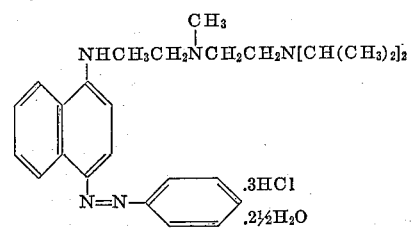

M.P. 169–171° C.

In like manner, the following related compounds are prepared, starting from the appropriate aniline derivative and substituted 1-naphthylamine:

1,1,4 - triethyl - 7-(4-phenylazo-1-naphthyl)diethylenetriamine, trihydrochloride, hydrate, M.P. 82–85° C.

3' - {4 - {{2-[bis(2-diethylaminoethyl)amino]ethyl}amino}-1-naphthylazo}-acetanilide, tetrahydrochloride, 2½ hydrate, M.P. 89° C. (dec.)

1,1 - diethyl - 7 - (4-phenylazo-1-naphthyl)diethylenetriamine, trihydrochloride, dihydrate, M.P. 165–167° C.

3 - diethylamino - 3'-[(4-phenylazo-1-naphthyl)amino]-1,1'-ethyliminodi-2-propanol, trihydrochloride 1,1' - {{2 - {[4-(p-benzoylphenylazo)-1-naphthyl]amino}-ethylimino}bis-trimethylene)}dipiperidine, tetrahydrochloride 2,6 - dichloro - 4 - {4-{{3-[bis(3-diethylaminopropyl)amino]propyl}amino}-1-naphthylazo}phenol, tetrahydrochloride 5 - {4-{{2-[(2-diethylaminoethyl)(2-hydroxyethyl)amino]ethyl}amino} - 1-naphthylazo}resorcinol, trihydrochloride 1,1 - dibutyl -7 -(4-carvacrylazo-1-naphthyl)-4-methyldiethylenetriamine, trihydrochloride 1,1 - diisopropyl-4-methyl-7-(1-naphthyl)-diethylenetriamine, employed as a starting material in the above preparation, is readily prepared according to the following procedure: A mixture of 1 kg. (5.35 moles) of N-(2-hydroxyethyl)-1-naphthylamine and 9 l. of constant boiling hydrobromic acid (48%) is boiled under reflux for 25 hours with mechanical stirring. Reflux is adjusted so that approximately 500 ml. of the condensed hydrobromic acid-water mixture is collected during this period. Upon cooling, the desired bromide, hydrobromide which separates is collected by filtration, the filter cake is sucked dry, and the product is digested thoroughly by stirring with 3 l. of boiling 2-propanol. The occluded brown impurities dissolve and the off-white crystals are collected by filtration, washed with fresh cold 2-propanol and dried in vacuo at 50° C. for 24 to 48 hours; M.P. softening at 200° C., M.P. 208–211° C.

In a 2 l. 3-necked flask is placed 166 g. (0.5 mole) of N-(2-bromoethyl)-1-naphthylamine, hydrobromide, 79 g. (0.5 mole) of N,N-diisopropyl-N'-methyl-ethylenediamine, 138 g. (1.0 mole) of anhydrous potassium carbonate and 500 ml. of dimethylformamide. This mixture is stirred and heated at 100° C. for 30 hours. Upon cooling, the reaction mixture is poured into 4 l. of water and the oil which separates is extracted thoroughly with ether. The combined ether extracts are dried over anhydrous potassium carbonate, the drying agent is collected by filtration, and the solvent removed in vacuo on the steam bath. The residue is distilled in vacuo through an 8-inch Vigreux column to give the desired 1,1-diisopropyl-4-methyl-7-(1-naphthyl)diethylenetriamine as a pale yellow oil, B.P. 153–157/ C./0.3 mm., $n_D^{25}$ 1.5619.

The other intermediate 1-(dialkylaminoalkylamino)naphthalenes employed herein can be prepared according to the procedures described under Examples 1 through 15.

Example 4

Sulfanilic acid (17.3 g., 0.10 mole) is diazotized and coupled into 28.4 g. (0.10 mole) of N,N-diethyl-2,2-dimethyl-N'-1-naphthyl-1,3-propanediamine according to the procedure described under Example 1 herein to give the desired p-[4-(3-diethylamino-2,2-dimethylpropylamino)-1-naphthylazo]benzenesulfonic acid, sesquihydrochloride, hydrate, of formula,

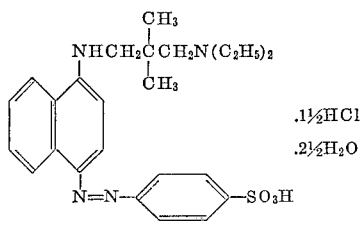

M.P. 200° C. (dec.).

In like manner, the following related compounds can be prepared, starting from the appropriate 1-(dialkylaminoalkylamino)naphthalene and sulfanilic acid:

p-{4-{2-[bis(2-hydroxyethyl)amino]ethylamino}-1-naphthylazo}benzenesulfonic acid, monohydrochloride, hemihydrate, M.P. 186–188° C.

p-[4-(2-piperidinoethylamino)-1-naphthylazo]benzenesulfonic acid, monohydrochloride, M.P. 198° C. (dec.)

p-{4-[2-(hexahydro-1-azepinyl)ethylamino]-1-naphthylazo}benzenesulfonic acid, monohydrochloride, M.P. 185–190° C.

p-[4-(5-diethylaminopentylamino)-1-naphthylazo]benzenesulfonic acid, M.P. 229° C. (dec.)

p-[4-(2-diethylaminoethylamino)-7-methoxy-1-naphthylazo]benzenesulfonic acid, ¾ hydrate, M.P. 210–211° C. (dec.)

p-{4-{2-[2-(2-dimethylaminoethyl)piperidino]ethylamino}-1-naphthylazo}benzensulfonic acid, M.P. 213–215° C.

p-{4-[(2-dicyclopentylaminoethyl)amino]-1-naphthylazo}benzenesulfonic acid p-{4-{{2-[bis(3-diethylaminopropyl)amino]ethyl}amino}-1-naphthylazo}benzenesulfonic acid N,N - diethyl - 2,2-dimethyl-N'-1-naphthyl-1,3-propanediamine, employed as a starting material in the above procedure, can be prepared as follows: a mixture of 157 g. (1.0 mole) of β-diethylaminopivaldehyde, 143 g. (1.0 mole) of 1-naphthylamine, 1 g. of p-toluenesulfonic acid and 400 ml. of benzene is boiled under reflux for 8 hours. The water which separates is removed through a Dean-Stark water trap. The benzene is removed in vacuo on the steam bath, the residue is dissolved in 300 ml. of methanol, and 5 g. of 20% palladium on charcoal catalyst is added. The resulting mixture is hydrogenated in a steel bomb at room temperature under an initial hydrogen pressure of 52 p.s.i.g. When hydrogenation is complete, the solvent is removed in vacuo on the steam bath and the residue is made strongly alkaline with 10% aqueous sodium hydroxide solution. The oil which separates is extracted with benzene, the combined benzene extracts are dried over anhydrous potassium carbonate and the benzene is removed in vacuo. The residue is distilled in vacuo through a 10-inch Vigreux column to give the desired N,N-diethyl-2,2-dimethyl-N'-1-naphthyl-1,3-propanediamine as a pale yellow oil. B.P. 161° C./1.0 mm., $n_D^{25}$ 1.5790.

The other intermediate 1-(dialkylaminoalkylamino)naphthalenes employed in the above example are prepared according to the procedures described under Examples 1 through 15 herein.

Example 5

A solution of 20.8 g. (0.3 mole) of sodium nitrite in 200 ml. of water is added slowly at 2 to 5° C. to a solution of 41.1 g. (0.3 mole) of m-amino-α-methylbenzyl-alcohol in 75 ml. of concentrated hydrochloric acid and 1 l. of water. The resulting diazonium salt solution is added at 0 to 5° C. to a stirred solution of 72.5 g. (0.3 mole) of 1-(2-diethylaminoethylamino)naphthalene in 80 ml. of concentrated hydrochloric acid and 2 l. of water. The deep purple solution is stirred for 2 hours at 0° C., then allowed to warm up to room temperature overnight. The reaction mixture is filtered and the filtrate made strongly alkaline with sodium hydroxide. The orange-red precipitate is collected by infiltration, dissolved in ether, and the ether solution is washed with water and dried over anhydrous potassium carbonate. The dry ether solution is divided into two portions. The first portion is evaporated to give the red crystalline free base, of formula,

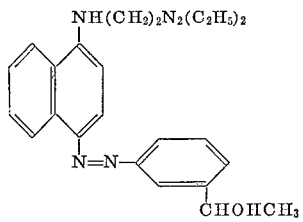

M.P. 90–92° C.

An excess of a hydrogen chloride-2-propanol mixture is added to the second ether portion and the hydrochloride salt that precipitates is collected by filtration and dried in vacuo. Purification from an ethanol-ether mixture gives the desired m-[4-(2-diethylaminoethylamino)-1-naphthylazo]-α-methylbenzyl alcohol, dihydroclorate, monohydrate, as a green solid, M.P. 150–152° C.

The salicylic acid salt is prepared as follows: to a solution of 30 g. (0.077 mole) of m-[4-(2-diethylaminoethylamino)-1-naphthylazo]-α-methylbenzyl alcohol in 150 ml. of acetone is added 10.6 g. (0.077 mole) of salicylic acid in 150 ml. of acetone. The mixture is concentrated and the crude salt crystallized from an acetone-ether mixture. The red salt, M.P. indefinite, beginning at 115° C., is the desired m - [4 - (2-diethylaminoethylamino)-1-naphthylazo]-α-methylbenzyl alcohol, salicylate.

The pamoic acid salt is prepared as follows: to a solution of 30 g. (0.077 mole) of m-[4-(2-diethylaminoethylamino)-1-naphthylazo]-α-methylbenzyl alcohol in 2 l. of water containing 154 ml. (0.154 mole) of 1.0 N hydrochloric acid is added a solution of 34.5 g. (0.077 mole) of 4,4'-methylenebis(3-hydroxy-2-naphthoic acid), disodium salt, monohydrate, in 300 ml. of water. The reddish-brown precipitate that forms is collected by filtration, washed thoroughly with water and dried in vacuo at 45° C. Crystallization from a 2-propanol-acetone mixture gives the desired m-[4-(2-diethylaminoethylamino)-1-naphthylazo]-α-methylbenzyl alcohol, salt with ½ f. wt. 4,4'-methylenebis(3-hydroxy-2-naphthoic acid), of formula,

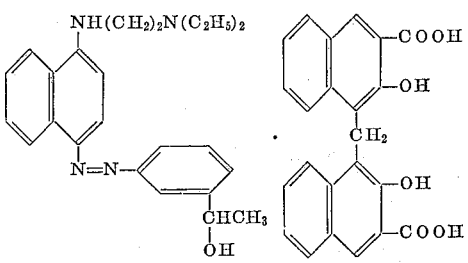

as red crystals, M.P. 145–150° C. (dec.).

In like manner, the following related compounds can be prepared, starting from the appropriate substituted 1-naphthylamine and aromatic amine:

m-{4-[2-(butylmethylamino)ethylamino]-1-naphthylazo}-α-methylbenzyl alcohol, M.P. 94–95° C.
m-{4-[(6-diethylaminohexyl)amino]-1-naphthylazo}benzyl alcohol
m-[4-(3-diethylamino-2,2-dimethylpropylamino)-1-naphthylazo]-α-methylbenzyl alcohol, dihydrochloride, M.P. 125° C. (dec.)
p-{4-[(2-diethylaminoethyl)amino]-1-naphthylazo}phenethyl alcohol, dihydrochloride, M.P. 178–179° C.
m-[4-(2-diisopropylaminoethylamino)-1-naphthylazo]-α-methylbenzyl alcohol, monohydrochloride, acetone solvate, M.P. 108–110° C.
m-{4-[2-isopropylmethylamino)ethylamino]-1-naphthylazo}-α-methylbenzyl alcohol, M.P. 99–101° C.
o-{4-[(2-diethylaminoethyl)amino]-1-naphthylazo}-α,α-dimethylbenzyl alcohol
m-{4-{2-[bis(2-ethoxyethyl)amino]ethylamino}-1-naphthylazo}-α-methylbenzyl alcohol, dihydrochloride, ⅓ hydrate, M.P. 144–146° C.

The other intermediate 1-(dialkylaminoalkylamino)naphthylenes employed above are prepared according to the procedures described under Examples 1 through 15 herein.

*Example 6*

Aniline (9.3 g. 0.1 mole) is diazotized and coupled into 27.2 g. (0.1 mole) of 1-diethylamino-3-(1-naphthylamino)-2-propanol according to the procedure outlined under Example 3 herein for the preparation of 1,1-diisopropyl-4 - methyl-7-(4-phenylazo-1-naphthyl)diethylenetriamine, trihydrochloride. The purple-green solid thus obtained is the desired 1-diethylamino-3-[4-(phenyazo)-1-naphthylamino]-2-propanol, dihydrochloride, of formula,

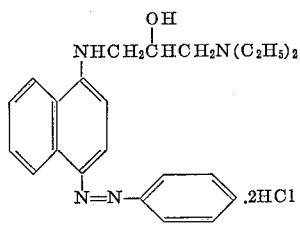

1-diethylamino-3-(1-naphthylamino)-2-propanol, B.P. 175–178° C./0.5 mm., employed as an intermediate in the above procedure, is prepared from 1-naphthol and 3-amino-1-diethylamino-2-propanol according to the method described in Example 9 herein for the synthesis of 1-(3-dimethylaminopropylamino)naphthalene.

In like manner, the following related compounds can be prepared, starting from the appropriate aromatic amine and 1-naphthylamine precursors:

α-(4-phenylazo-1-naphthylaminoethyl)-1-piperidineethanol, monohydrate, M.P. 112° C. (dec.)
1-diethylamino-3-[4-(phenylazo)-1-naphthylamino] 2-methyl-2-propanol, dihydrochloride
4-diethylamino-3-methyl-1-{[4-(5,6,7,8-tetrahydro-1-naphthylazo)-1-naphthyl]amino}-2-butanol
4-dimethylamino-3-methyl-1-[(4-phenylazo-1-naphthyl)amino]-2-butanol
4-{[4-(5-chloro-o-tolylazo)-1-naphthyl]amino}-1-diethylamino-2-butanol
N,N-diethyl-2-methoxy-N'-{4-[p-(methylthio)phenylazo]-1-naphthyl}-1,3-propanediamine
p-{4-{[2-dimethylamino-1-(methoxymethyl)ethyl]amino}-1-naphthylazo}benzoic acid
2-ethoxy-N,N-diethyl-N'-(4-phenylazo-1-naphthyl)-1,3-propanediamine The intermediate 1-naphthylamine compounds can be prepared according to the procedures outlined above together with those described under Examples 1 through 15 herein.

*Example 7*

To a solution of 9.3 g. (0.1 mole) of aniline in 20.6 ml. of concentrated hydrochloric acid, 100 ml. of water and 100 g. of ice cooled to 0° C. is added 6.9 g. (0.1 mole) of sodium nitrite dissolved in 100 ml. of cold water. After the diazotization is complete, the diazonium salt solution is added with stirring at 0° C. to a solution of 24.2 g. (0.1 mole) of N,N,2-trimethyl-N'-1-naphthyl-1,3-propanediamine in 17 ml. of concentrated hydrochloric acid and 250 ml. of water. The resulting purple solution is stirred for 3 hrs. at 0–5° C. and allowed to warm to room temperature. The red solution is made alkaline with sodium hydroxide and the deep red solid that precipitates is collected by filtration, dried and crystallized successively from ethanol and n-heptane. The red needles thus obtained, M.P. 127–129° C., are the desired N,N-2-trimethyl-N'-(4-phenylazo-1-naphthyl)-1,3-propanediamine, of formula,

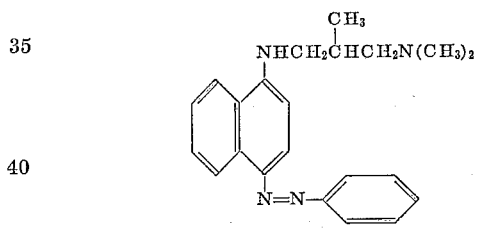

Utilizing similar procedures, the following related compounds can be prepared, starting from the appropriately substituted 1-naphthylamine and aromatic amine compound:

N,N-dimethyl-N'-(4-phenylazo-1-naphthyl)-1,3-propanediamine, dihydrochloride, dihydrate, M.P. 108–110° C.
N-ethyl-N-methyl-N'-(4-phenylazo-1-naphthyl)ethylenediamine, dihydrochloride, hydrate, M.P. 130° C. (dec.)
N-isopropyl-N-methyl-N'-(4-phenylazo-1-naphthyl)ethylenediamine, M.P. 77–80° C.
N'-(4-m-biphenylylazo-1-naphthyl)-N-ethyl-N-methylethylenediamine, monohydrochloride, M.P. 192–193° C.
N'-(8-chloro-4-phenylazo-1-naphthyl)-N,N-diethylethylenediamine, dihydrochloride, dihydrate, M.P. 163–165° C.
N'-(7-chloro-4-phenylazo-1-naphthyl)-N,N-diethylethylenediamine, dihydrochloride, ⅓ hydrate, M.P. 168–170° C.
N-cyclohexyl-N-methyl-N'-(4-phenylazo-1-naphthyl)ethylenediamine, monohydrochloride, M.P. 208–209° C.
$N^1,N^1$-dimethyl-$N^2$-(4-phenylazo-1-naphthyl)-1,2-propanediamine, monohydrochloride, M.P. 196–199° C.

The starting material, N,N,2-trimethyl-N'-1-naphthyl-1,3-propanediamine, can be prepared as follows: in a 2-l. 3-necked flask fitted with a mechanical stirrer, condenser and dropping funnel is placed a suspension of 36 g. (0.75 mole) of 50% sodium hydride in oil dispersion in 200 ml. of xylene. A solution of 72 g. (0.5 mole) of 1-naphthylamine in 300 ml. of xylene is then added, and the mixture is stirred and boiled under reflux for 2 hours, during which time the thick green sodium salt precipitates. The reaction mixture is allowed to cool to room temperature. Meanwhile, 100 g. (0.58 mole) of 3-dimethylamino-2-methylpropyl chloride, hydrochloride is suspended in 200 ml. of concentrated ammonium hydroxide and the base which separates is extracted with three 100 ml. portions of xylene. The combined extracts are dried over anhydrous sodium sulfate, the drying agent is collected by filtration, and the xylene filtrate is cautiously added with stirring to the sodium hydride-naphthylamine mixture. The addition is not exothermic. After the addition is complete, the mixture is stirred and boiled under reflux for 20 hours. The deep brown reaction mixture is cooled to room temperature and 200 ml. of water is cautiously added with stirring. The aqueous layer which separates is discarded and the organic layer is washed with two 200 ml. portions of water to remove any undissolved salts. The xylene extracts are dried over anhydrous potassium carbonate, the drying agent is collected by filtration, the solvent is removed and the residue distilled in vacuo through an 8-inch Vigreux column. The desired N,N,2-trimethyl-N'-1-naphthyl-1,3-propanediamine is obtained as a yellow oil, B.P. 117–118° C./0.15 mm., which solidifies in the receiver.

The other intermediate 1-(dialkylaminoalkylamino)naphthalenes employed herein can be prepared from the appropriate naphthalene compound according to the procedures described under Examples 1 through 15 herein.

*Example 8*

Aniline (4.7 g., 0.05 mole) is diazotized and coupled into 13.5 g. (0.05 mole) of 4-[3-(1-naphthylamino)propyl]morpholine according to the procedure described under Example 7 herein. The reddish-brown crystals thus obtained, M.P. 154–156° C., are the desired 4-[3-(4-phenylazo-1-naphthylamino)propyl]morpholine, of formula,

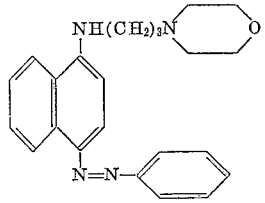

In like manner, the following related compounds can be prepared, starting from the appropriate 1-naphthylamine compound and aromatic amine:

4-[2-(4-phenylazo-1-naphthylamino)ethyl]morpholine, M.P. 173–174° C.
2,6-dimethyl-4-[2-(4-phenylazo-1-naphthylamino)ethyl]morpholine, M.P. 167–168° C.
1-[3-(4-phenylazo-1-naphthylamino)propyl]pyrrolidine, M.P. 104–105° C.
1-[3-(4-phenylazo-1-naphthylamino)propyl]piperidine, dihydrochloride, dihydrate, M.P. 170–180° C. (dec.)
1-[2-(4-phenylazo-1-naphthylamino)ethyl]hexamethyleneimine, dihydrochloride, M.P. 190–200° C.
1-[2-(4-phenylazo-1-naphthylamino)ethyl]piperidine, dihydrochloride, tetrahydrate, M.P. 180° C.
1-[2-(4-phenylazo-1-naphthylamino)ethyl]-4-pipecoline, M.P. 104–105° C.
2,6-dimethyl-1-[2-(4-phenylazo-1-naphthylamino)ethyl]piperidine, monohydrochloride, M.P. 222–223° C.

The starting material, 4-[3-(1-naphthylamino)-propyl]morpholine, can be prepared as follows: a mixture of 86.4 g. (0.6 mole) of 1-naphthol, 102.8 g. (0.714 mole) of 4-(1-aminopropyl)morpholine, 93.6 g. (0.9 mole) of sodium bisulfite and 600 ml. of water is agitated in a pressure vessel at 150° C. for 8 hours. The reaction mixture is removed from the reactor and made alkaline with sodium hydroxide solution. The product is collected by filtration and crystallized from aqueous ethanol to give the desired 4-[3-(1-naphthylamino)propyl]morpholine as colorless crystals, M.P. 82–83.5° C.

The other intermediate 1-naphthylamine compounds are prepared according to the procedures described under Examples 1 through 15 herein.

*Example 9*

Sulfanilic acid (17.3 g., 0.1 mole) is diazotized and coupled with 22.8 g. (0.1 mole) of 1-(3-dimethylaminopropylamino)naphthalene according to the procedure outlined under Example 1 herein. The desired p-[4-(3-dimethylaminopropylamino)-1-naphthylazo]benzenesulfonic acid, monohydrochloride, dihydrate, of formula,

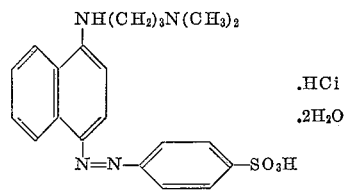

is obtained as a purple solid, M.P. 220–222° C.

In like manner the following related compounds can be prepared starting from the appropriate 1-naphthylamine compound and aromatic amine:

4-[4-(3-dimethylaminopropylamino)-1-naphthylazo]-1-naphthalenesulfonic acid, monohydrochloride, sesquihydrate, M.P. 228–230° C.
4-[4-(2-diethylaminoethylamino)-1-naphthylazo]-1-naphthalenesulfonic acid, M.P. 229–230° C.
4-[4-(2-dibutylaminoethylamino)-1-naphthylazo]-1-naphthelenesulfonic acid, monohydrate, M.P. 205–210° C.
p-{4-[(2-diethylaminoethyl)amino]-7-methyl-1-naphthylazo}benzenesulfonic acid
m-{4-[(1-ethyl-3-piperidyl)amino]-1-naphthylazo}benzenesulfonic acid
5-{4-{[2-hexylmethylamino)ethyl]amino}-1-naphthylazo}-benzenesulfonic acid
m-{4-{{2-[3-(1-methyl-2-pyrrolidinyl)piperidino]ethyl}amino}-1-naphthylazo}benzenesulfonic acid
7-{4-{[2-(3-methylpiperidino)ethyl]amino}-1-naphthylazo}-1,3-naphthalenedisulfonic acid The starting material, 1-(3-dimethylaminopropylamino)naphthalene, can be prepared as follows: a mixture of 28.8 g. (0.2 mole) of 1-naphthol, 40.4 g. (0.4 mole) of 3-dimethylaminopropylamine and 31.2 g. (0.3 mole) of sodium bisulfite in 250 ml. of water is shaken in a steel bomb at 150° C. for 8 hours. The mixture is rinsed from the bomb with water, made strongly alkaline with sodium hydroxide solution and extracted thoroughly with ether. The ether extracts are dried over anhydrous sodium sulfate, the ether removed in vacuo, and the residue distilled in vacuo through a 6-inch Vigreux column to give the desired 1-(3-dimethylaminopropylamino)naphthalene as a yellow oil, B.P. 184–185° C./2.5 mm., $n_D^{25}$ 1.6054.

The other intermediate 1-naphthylamine compounds are prepared according to the procedures described under Examples 1 through 15 herein.

*Example 10*

Aniline (3.53 g., 0.038 mole) is diazotized and coupled with 12.0 g. (0.038 mole) of N-[2-(2-diethylaminoethylthio)ethyl]-1-naphthylamine according to the procedure described under Example 7 herein. The acid solution of the dye is made alkaline with ammonium hydroxide and the azo dye is extracted with ether. The combined ether extracts are washed with water and dried over anhydrous magnesium sulfate. The drying agent is collected by filtration and the dry ether solution is treated with 30 ml. (0.03 mole) of 1 N ethereal hydrogen chloride. The crystalline solid is collected by filtration and crystallized from 2-propanol to give the desired N-[2-(2-diethylaminoethylthio)ethyl] - 4 - phenylaxo-1-naphthylamine, monohydrochloride, of formula,

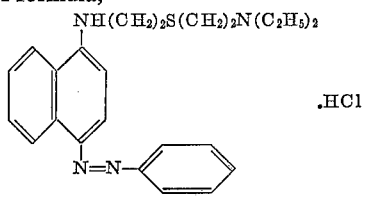

as orange crystals, M.P. 115–116° C.

Utilizing the preparative methods outlined under Examples 1 through 15 herein, the following related compounds can be prepared starting from the appropriate 1-naphthylamine compound and aromatic amine:

3'-{4-{[2 - (3 - diethylaminopropylthio)ethyl]amino}-1-naphthylazo}-acetanilide

1 - {2 - {2 - {{4 - [p-(ethylthio)phenylazo] - 1 - naphthyl}amino}ethylthio}ethyl}piperidine m-{4-{[3 - (3 - diethylaminopropylthio)propyl]amino}-1-naphthylazo}-α-methylbenzyl alcohol N-[3-(2-diethylaminoethylthio)propyl] - 4 - (α,α,α-trifluoro-m-tolylazo)naphthylamine m-{4 - {[2 - (2 - dimethylaminoethylthio)ethyl]amino}-1-naphthylazo}benzenesulfonic acid p-{4-{[3-(2 - morpholinoethylthio)propyl]amino}-1-naphthylazo}-N-(2-pyridyl)benzenesulfonamide 4-(p-chlorophenylazo) - N - [2-(2-diethylaminoethylthio)ethyl]1-naphthylamine p-{4-{[2 - (2 - diisopropylaminoethylthio)ethyl]amino}1-naphthylazo}benzenearsonic acid N-[2-(2 - diethylaminoethylthio)ethyl] - 1 - naphthylamine, employed as a starting material in the above procedure, is prepared from 1-(2-bromoethylamino)naphthalene and 2-diethylaminoethanethiol according to the following method: 33.9 g. (0.2 mole) of 2-diethylaminoethanethiol hydrochloride is suspended in ammonia and extracted with toluene. To this dried toluene solution is then added a solution of 12 g. of sodium methoxide in 40 ml. of methanol and the mixture is stirred at room temperature for 2 hours. A toluene solution of 1-(2-bromoethylamino)naphthalene, prepared by suspending 66.2 g. (0.2 mole) of the hydrobromide in concentrated ammonium hydroxide and extracting with toluene, is then added and the mixture boiled under reflux for 18 hours. Upon cooling, the sodium bromide which separates is collected by filtration and the filtrate is washed twice with water, dried over anhydrous potassium carbonate and evaporated in vacuo on the steam bath. The residue is distilled in vacuo through an 8-inch Vigreux column to give the desired N-[2-(2-diethylaminoethylthio)ethyl]-1-naphthylamine as a yellow oil, B.P. 164–165° C./0.1 mm., $n_D^{25}$ 1.6015.

The other intermediate 1-naphthylamine compounds are prepared according to the procedures described under Examples 1 through 15 herein.

*Example 11*

Aniline (18.6 g., 0.20 mole) is diazotized and coupled into 56.9 g. (0.20 mole) of $N^1,N^1$-diethyl-$N^4$-1-naphthyl-1,4-pentanediamine according to the procedure described under Example 3 herein. The deep purple solid thus obtained, M.P. 120–125° C., is a hygroscopic mixture of the monohydrochloride and dihydrochloride of $N^1,N^1$-diethyl - $N^4$-(4 - phenylazo-1-naphthyl)-1,4-pentanediamine, of formula,

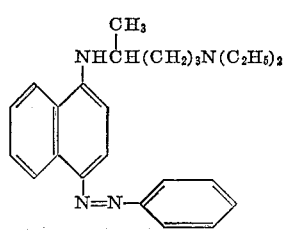

In like manner the following related compounds can be prepared, starting from the properly substituted 1-naphthylamine and appropriate aromatic amine:

N,N-diethyl-N'-(4 - phenylazo - 1 - naphthyl)ethylenediamine, M.P. 61–62° C.

N-butyl - N - methyl-N'-(4 - phenylazo-1-naphthyl)ethylenediamine, M.P. 55–57° C.

$N^4$-{4-(p-chlorophenylazo)-7-ethoxy - 1 - naphthy}-$N^1,N^1$-diethyl-1,4-pentanediamine, monohydrochloride N,N-diethyl-N'-(4 - phenylazo-1-naphthyl)-1,3-propanediamine, M.P. 90–92° C.

N,N-diisobutyl-N'-(4-phenylazo - 1 - naphthyl)ethylenediamine, dihydrochloride, ¾ hydrate, M.P. 157–159° C.

o-{4 - [(4 - diethylaminopentyl)amino] - 1 - naphthylazo} benzenesulfonic acid, monohydrochloride $N^5$-[4-(4 - chloro-α,α,α-trifluoro-m-tolylazo)-1-naphthyl]-$N^1,N^1$-diethyl-1,5-hexane diamine, dihydrochloride 2-{p-{4-[(1-methyl - 3 - piperidinopropyl)amino]-1-naphthylazo}phenoxy}ethanol $N^1,N^1$-diethyl - $N^4$-1-naphthyl-1,4-pentanediamine, employed as a starting material in the above procedure, is prepared according to the following method: a mixture of 72 g. (0.5 mole) of 1-naphthylamine, 80 g. (0.51 mole) of 5-diethylamino-2-pentanone, 400 ml. of xylene and 1 g. of p-toluenesulfonic acid is boiled under reflux for 18 hours and the water which is formed is removed through a water separator. The reaction mixture is concentrated in vacuo on the steam bath and the residue is dissolved in 300 ml. of methanol and hydrogenated in a Parr hydrogenation apparatus in the presence of 2 g. of palladium on carbon catalyst at an initial hydrogen pressure of 54 p.s.i.g. Additional quantities of palladium and platinum oxide catalyst are added during the reduction as required. The hydrogenation is complete after 6 hours. The catalyst is collected by filtration and the solvent removed in vacuo. Distillation of the residue through a 7-inch Vigreux column in vacuo gives the desired $N^1,N^1$-diethyl-$N^4$-1-naphthyl-1,4-pentanediamine as a yellow oil, B.P. 149–151° C./0.2 mm., $n_D^{25}$ 1.5730.

The other intermediate 1-naphthylamine compounds are prepared according to the procedures described under Examples 1 through 15 herein.

*Example 12* m-Amino-α-methylbenzylalcohol (9.0 g., 0.066 mole) is diazotized and coupled into 21.3 g. (0.066 mole) of N,N-diethyl-$N^1$-1-naphthyl - 1,1-cyclohexanebis(methylamine) according to the procedure given under Example 3 herein for the preparation of 1,1-diisopropyl-4-methyl-7-(4-phenylazo - 1 - naphthyl)diethylenetriamine, trihydrochloride. The desired m-{4-[1 - (diethylaminomethyl)cyclohexylmethylamino] - 1 - naphthylazo}-α-methylbenzylalcohol, dihydrochloride, hemihydrate, of formula

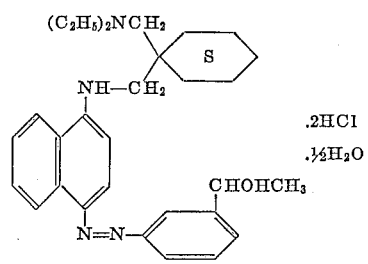

is obtained as a hygroscopic purple solid, M.P. indefinite beginning at 153° C.

In like manner the following related compounds can be prepared, starting from the appropriate substituted 1-naphthylamine and aromatic amine:

1-{2-[(4-phenylazo-1-naphthyl)amino]ethyl}-1-azaspiro[4.5]decane, M.P. 105–107° C.
3-[2-(4-phenylazo-1-naphthylamino)ethyl]-3-azaspiro[5.5]undecane, dihydrochloride, M.P. 204° C. (dec.)
m-{4-[(1-ethyl-4-piperidyl)amino]-1-naphthylazo}-α-methylbenzyl alcohol
p-{4-[(4-diethylaminocyclohexyl)amino]-1-naphthylazo}benzyl alcohol
3-{3-[(4-phenylazo-1-naphthyl)amino]propyl}-3-azabicyclo[3.2.2]nonane
1-{{1-{{[4-(3,4-dichlorophenylazo)-1-naphthyl]amino}methyl}methyl}cyclohexyl}methyl}pyrrolidine
4'-{4-{[(1-methyl-3-pyrrolidinyl)methyl]amino}-1-naphthylazo}acetophenone
2-{{[4-(p-ethylphenylazo)-1-naphthyl]amino}methyl}-pyrrolidine N,N - diethyl - N' - 1 - naphthyl - 1,1 - cyclohexanebis(methylamine), employed as a starting material in the above preparation, is synthesized as follows: tetrahydrobenzaldehyde (226 g., 2.05 moles), diethylamine hydrochloride (185 g., 1.69 moles), paraformaldehyde (78 g. 2.6 moles) and 125 ml. of ethanol are boiled under reflux for 2 hours. An additional 78 g. of paraformaldehyde are added and reflux is continued for 6 hours. The reaction mixture is poured into 2 l. of water and extracted with ether. The combined ether extracts are discarded and the water layer is made alkaline by the addition of sodium hydroxide. The oily layer which separates is extracted with ether and the combined ether extracts are dried over anhydrous potassium carbonate. The ether is removed on the steam bath and the residue is distilled in vacuo to give the intermediate diethylaminomethyl-tetrahydrobenzaldehyde, of formula,

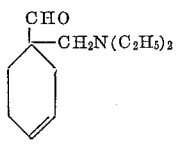

as a yellow oil, B.P. 59–60° C. 0.1 mm., $n_D^{25}$ 1.4780. This intermediate is then condensed with 1-naphthylamine and hydrogenated according to the procedure outlined under Example 4 herein for the preparation of N,N-diethyl-2,2-dimethyl-N'-1-naphthyl-1,3-propanediamine. The desired intermediate, N,N-diethyl-N'-1-naphthyl-1,1-cyclohexanebis(methylamine) is obtained as a viscous yellow oil, B.P. 161–162° C./0.07 mm.

The other intermediate 1-naphthylamines employed herein can be prepared from the appropriate 1-naphthol or 1-naphthylamine precursors according to the procedures described under Examples 1 through 15.

*Example 13*

N-(4-amino-1-naphthyl)-N-2-diethylaminoethyl)-2,2,2-trifluoroacetamide, monohydrochloride (9.75 g., 0.025 mole) is diazotized according to the procedure described under Example 2 herein. This diazonium salt solution is subsequently added in one portion to a solution of 3.6 g. (0.025 mole) of 2-naphthol and 4.2 g. of sodium bicarbonate in 200 ml. of water, 200 ml. of ethanol, and 200 g. of ice containing a trace of Carbowax stearate. The temperature is maintained at 5° C. The mixture is allowed to stir overnight and the red precipitate is collected by filtration, dried and crystallized from 2-propanol. This is the desired intermediate, of formula,

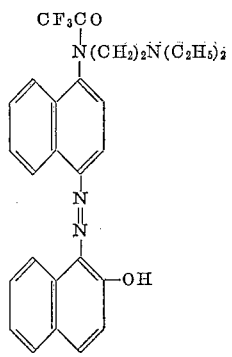

M.P. 158–162° C.

The intermediate trifluoroacetamide (9.1 g.) is suspended in a mixture of 100 ml. of methanol and 50 ml. of methanol containing 0.1 mole of sodium hydroxide and warmed to 60° C., at which temperature solution occurs. The mixture is stirred at room temperature for 48 hours and the iridescent dark green crystals that form are collected by filtration, washed with water, and dried in vacuo. This is the desired 1-[4-(2-diethylaminoethyl-amino)-1-naphthylazo]-2-naphthol, of formula,

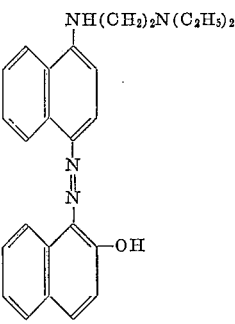

M.P. 146–150° C.

By similar procedures, the following related compounds can be prepared, starting from the appropriate N-(dialkylaminoalkyl) - N - (4-amino-1-naphthyl)trifluoroacetamide and hydroxy aromatic carbocyclic compound via the N-[4-(arylazo)-1-naphthyl] - N - (dialkylaminoalkylamino)-α,α,α-trifluoroacetamides:

4-{4-[(2-diethylaminoethyl)amino]-1-naphthylazo}-1-naphthol
4-{4-[(3-piperidinopropyl)amino]-1-naphthylazo}pyrogallol
4-{4-[(2-diethylaminoethyl)amino]-6-methoxy-1-naphthylazo}-1-naphthol
4-{4-{[2-(isopropylmethylamino)ethyl]amino}-1-naphthylazo}-3-hydroxy-2-naphthoic acid
1-{4-[(2-diethylaminoethyl)amino]-1-naphthylazo}-5,6,7,8-tetrahydro-2-naphthol
4'-chloro-3-hydroxy-4-{4-{[2-(1-pyrrolidinyl)ethyl]amino}-1-naphthylazo}-2-naphthanilide
1-{4-[(3-dimethylamino-2,2-dimethylpropyl)amino]-1-naphthylazo}-2,7-naphthalenediol
1-{4-[1-methyl-4-piperidyl)amino]-1-naphthylazo}-2-naphthol-3,6-disulfonic acid The intermediate N - (4 - arylazo - 1 - naphthyl)-N,N - (dialkylaminoalkyl) - α,α,α - trifluoroacetamides are prepared from the appropriate hydroxy aromatic carbocyclic compound and N - (dialkylaminoalkyl) - N - (4-amino - 1 - naphthyl) - α,α,α - trifluoroacetamide compounds in accordance with the method described above.

Alternatively, the desired 1 - [4 - (2 - diethylaminoethylamino) - 1 - naphthylazo] - 2- naphthol can be prepared by the hydrolysis of N - (2 - diethylaminoethyl) - N - [4 - (2 - hydroxy - 1 - naphthylazo) - 1 - naphthyl]formamide, of formula,

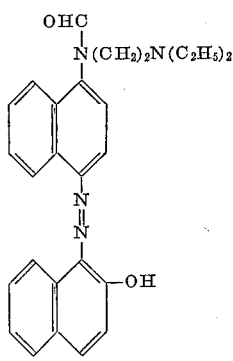

which is prepared as follows: a cooled solution of 0.772 g. (0.011 mole) of sodium nitrite in 50 ml. of water is added to a solution of 4.0 g. (0.011 mole) of N - (2-diethylaminoethyl) - N - (4 - amino - 1 - naphthyl) formamide, dihydrochloride in dilute hydrochloric acid. After five minutes, the diazonium salt solution is added at 0–5° C. with stirring to a solution of 1.6 g. (0.011 mole) of 2 - naphthol and 1.876 g. (0.022 mole) of sodium bicarbonate in 80 ml. of water and 100 ml. of ethanol. The reaction mixture is allowed to warm to room temperature and stand overnight. The red solid that precipitates is collected by filtration, dried in vacuo, and crystallized from ethanol; M.P. 170–172° C.

*Example 14*

4-methylthioaniline (9.3 g., 0.0666 mole) is diazotized and coupled into 16.0 g. (0.0666 mole) of 1-methyl-4-(1-naphthylamino)piperidine according to the procedure described under Example 7. Crystallization of the crude dye from 2-propanol gives the desired 1-methyl-4-{{4-[p - (methylthio)phenylazo] - 1 - naphthyl}amino}piperidine, of formula,

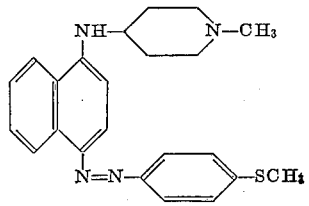

as orange crystals, M.P. 131–135° C.

In like manner the following related compounds can be prepared, starting from the appropriate arylamine and substituted 1 - naphthylamine precursors:

N,N-diethyl-N'-{4-[o-(methylthio)phenylazo]-1-naphthyl}ethylenediamine, monohydrochloride, M.P. 203–205° C.

N,N-diethyl-N'-{4-[p-(methylthio)phenylazo]-1-naphthyl}ethylenediamine, M.P. 76–78° C.

N,N-diethyl-N'-{4-[o-(phenylthio)phenylazo]-1-naphthyl}ethylenediamine, M.P. 129–130° C.

N,N-diisopropyl-N'-{4-[m-(methylthio)phenylazo]-1-naphthyl}ethylenediamine

N,N-dimethyl-N'-{4-[p-(ethylthio)phenylazo]-1-naphthyl}ethylenediamine

N,N-bis(2-ethoxyethyl)-N'-{4-[4-(phenylthio)-1-naphthylazo]-1-naphthyl}ethylenediamine, hydrochloride, M.P. 100–102° C.

1-methyl-3-{{{4-[o-(phenyldithio)phenylazo]-1-naphthyl}amino}methyl}piperidine{p-[4-(2-diethylaminoethylamino)-1-naphthylazo]phenylthio}acetic acid, M.P. 159–160° C.

1 - methyl - 4 - (1 - naphthylamino)piperidine, B.P. 144–146° C./0.2 mm., employed as a starting material in the above preparation, is prepared from 1 - methyl - 4 - piperidone and 1-naphthylamine according to the procedures described under Example 11 herein for the preparation of $N^1,N^1$ - diethyl - $N^4$ - 1 - naphthyl - 1,4 - pentanediamine. The other intermediate 1-naphthylamines employed herein can be prepared from the appropriate 1-naphthol or 1-naphthylamine precursors according to the procedures described under Examples 1 through 15.

*Example 15*

A solution of 14.5 g. (0.1 mole) of p-aminophenol, monohydrochloride in 250 ml. of water and 8.5 ml. of concentrated hydrochloric acid is cooled to 0° C. and diazotized by the addition of a solution of 6.9 g. (0.1 mole) of sodium nitrite in 50 ml. of water. The diazonium salt solution is stirred for 5 minutes at 0° C., then added portionwise to a solution of 24.2 g. (0.1 mole) of 1-(2-diethylaminoethylamino)naphthalene in a mixture of 250 ml. of 95% ethanol, 250 ml. of water, and 17 g. of concentrated hydrochloric acid, while maintaining the temperature at 0–5° C. The deep blue reaction mixture is stirred for ½ hour at 0–5° C., then neutralized by the addition of 60 g. of solid sodium acetate. After standing overnight the product solidifies and is collected by filtration, washed with water, and dried. Crystallization from ethanol gives the desired p-[4-(2-diethylaminoethylamino)-1-naphthylazo]phenol, monohydrochloride, of formula,

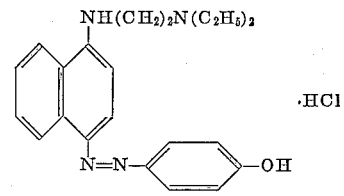

as orange crystals, M.P. 215–216° C.

The free base is prepared by dissolving the monohydrochloride salt in an excess of ammonium hydroxide in a 1:1 water-ethanol mixture and precipitating the base with Dry Ice; M.P. 86–94° C.

Utilizing the preparative methods described under Examples 1 through 15 herein, the following related compounds can be prepared, starting from the appropriate aminophenol and substituted 1-naphthylamine precursors:

m-[4-(2-diethylaminoethylamino)-1-naphthylazo]phenol, dihydrochloride, hemihydrate, M.P. 179–180° C.

p-{4-[2-(5-ethyl-2-methylpiperidino)ethylamino]-1-naphthylazo}phenol, monohydrochloride, M.P. 214° C.

p-{4-[2-(isopropylmethylamino)ethylamino]-1-naphthylazo}phenol, monohydrochloride, M.P. 204–206° C.

5-[4-(2-diethylaminoethylamino)-1-naphthylazo]resorcinol, dihydrochloride, 1½ hydrate, M.P. 194° C. (dec.)

α-diethylamino-4-[4-(2-diethylaminoethylamino)-1-naphthylazo]-o-cresol, trihydrochloride, dihydrate, M.P. 181–184° C. (dec.)

4-{4-{[2-(isopropylmethylamino)ethyl]amino}-1-naphthylazo}-α-piperidino-o-cresol, trihydrochloride α-diethylamino-5-{4[(2-diethylaminoethyl)amino]-1-naphthylazo}-o-cresol, trihydrochloride 4-{4-{[2-(1-pyrrolidinyl)ethyl]amino}-1-naphthylazo}-α-1-pyrrolidinyl-o-cresol, trihydrochloride The other intermediate 1-naphthylamine compounds are prepared according to the procedures described under Examples 1 through 15 herein.

*Example 16*

N'-(6-methoxy-3-pyridazinyl)sulfanilamide (28.0 g., 0.1 mole) is diazotized and coupled into 24.3 g. (0.1 mole) of 1-(2-diethylaminoethylamino)naphthalene according to the procedure described under Example 7 herein. Crystallization of the crude product from a dimethylacetamide-water mixture gives the desired p-[4-(2-diethylaminoethylamino)-1-naphthylazo]-N-(6-methoxy-3 - pyridazinyl)benzenesulfonamide, of formula,

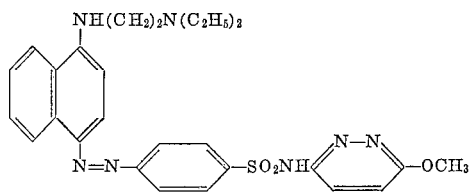

as orange-red crystals, M.P. 202–204° C.

Utilizing the preparative methods outlined under Examples 1 through 15 herein, the following related compounds can be prepared, starting from the properly substituted 1-naphthylamine and an aromatic carbocyclic amine:

N-amidino-p-[4-(2-diethylaminoethylamino)-1-naphthylazo]benzenesulfonamide, M.P. 224–226° C.
p-[4-(2-diethylaminoethylamino)-1-naphthylazo]benzenesulfonamide, M.P. 170–172° C.
p-[4-(3-piperidinopropylamino)-1-naphthylazo]benzenesulfonamide, M.P. 211–213° C.
p-[4-(2-diethylaminoethylamino)-1-naphthylazo]-N-2-thiozolylbenzenesulfonamide, M.P. 220–222° C.
m-[4-(2-diethylaminoethylamino)-1-naphthylazo]benzenesulfonamide
3-methoxy-6-{N-{p-{4-{[2-(1-pyrrolidinyl)ethyl]amino}-1-naphthylazo}phenylsulfonyl}acetamido}pyridazine
4'-{p-{4-[(3-piperidinopropyl)amino]-1-naphthylazo}phenylsulfonyl}acetanilide
5-{N-{p-{4-[(2-dimethylaminoethyl)amino]-1-naphthylazo}phenylsulfonyl}acetamido}-3,4-dimethylisoxazole The other intermediate 1-naphthylamines employed herein can be prepared from the appropriate 1-naphthol or 1-naphthylamine precursors according to the procedures described under Examples 1 through 15.

Example 17

4'-aminononanophenone (4.95 g., 0.021 mole) is diazotized and coupled into 5.15 g. (0.021 mole) of 1-(2-diethylaminoethylamino)naphthalene according to the procedures described under Example 7. Crystallization of the crude product from 2-propanol gives the desired 4' - [4 - (2 - diethylaminoethylamino)-1-naphthylazo]-nonanophenone, of formula,

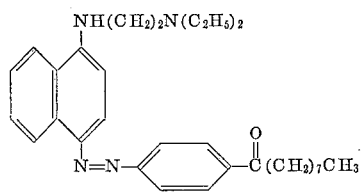

as maroon crystals, M.P. 79–80° C.

In like manner, the following related compounds can be prepared, starting from 1-(2-diethylaminoethylamino)naphthalene and aminoaryl ketone:

3'-[4-(2-diethylaminoethylamino)-1-naphthylazo]acetophenone, M.P. 96–97° C.
4'-[4-(2-diethylaminoethylamino)-1-naphthylazo]acetophenone, M.P. 102–103° C.
4'-[4-(2-diethylaminoethylamino)-1-naphthylazo]propiophenone, M.P. 113–114° C.
4'-[4-(2-diethylaminoethylamino)-1-naphthylazo]butyrophenone, M.P. 89–91° C.
4'-[4-(2-diethylaminoethylamino)-1-naphthylazo]valerophenone, M.P. 93–94° C.
4'-[4-(2-diethylaminoethylamino)-1-naphthylazo]heptanophenone, M.P. 82–84° C.
4'-[4-(2-diethylaminoethylamino)-1-naphthylazo]chalcone, M.P. 116–117° C.
4-[4-(2-diethylaminoethylamino)-1-naphthylazo]benzophenone, dihydrochloride, M.P. 140–160° C. (dec.)

Example 18

3,4-dimethylaniline (12.1 g., 0.1 mole) is diazotized and coupled into 24.3 g. (0.1 mole) of 1-(2-diethylaminoethylamino)naphthalene according to the procedure described under Example 10 herein. Crystallization of the product from ethanol gives the desired N,N-diethyl-N'-[4-(3,4-xylylazo)-1-naphthyl]ethylenediamine, monohydrochloride, of formula,

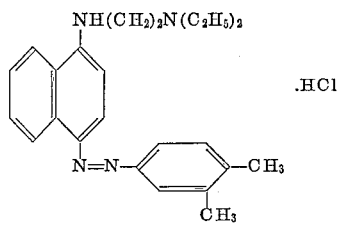

as orange-red crystals, M.P. 180–182° C.

Utilizing the general methods outlined under Examples 1 through 15 herein, the following related compounds can be prepared, starting from a 1-(dialkylaminoalkyamino)naphthalene and the appropriate aniline derivative:

N,N-diethyl-N'-[4-(o-tolylazo) - 1 - naphthyl]ethylenediamine, M.P. 92–93° C.
N,N-diethyl-N'-[4-(m-tolylazo) - 1 - naphthyl]ethylenediamine, monocitrate, M.P. 102–107° C.
N,N-diethyl-N'-(4-p-tolylazo-1-naphthyl)ethylenediamine, M.P. 78–79° C.
N'[4-(o-tert-butylphenylazo)-1-naphthyl]-N,N-diethylethylenediamine, dihydrochloride, 2½ hydrate, M.P. indefinite, 139–149° C.
N'-[4-(p-ethylphenylazo)-1-naphthyl] - N,N-diethylethylenediamine
N'-[4-(p-dodecylphenylazo)-1-naphthyl]-N,N-diethylethylenediamine
N,N-diethyl-N' - (4-p-tolylazo-1-naphthyl) - 1,8-octanediamine
1-{2-{{4 - (p-cyclohexylphenylazo) - 1 - naphthyl}amino}ethyl}-2,4,6-trimethylpiperidine The other intermediate 1-naphthylamines employed herein can be prepared from the appropriate 1-naphthol or 1-naphthylamine precursors according to the procedures described under Examples 1 through 15.

Example 19 p-Aminobenzoic acid (8.1 g., 0.059 mole) is dissolved in 100 ml. of water and 20 ml. of 6 N sodium hydroxide and diazotized by the addition of 59 ml. of 1 M sodium nitrite solution at 0° C. Subsequently, 30 ml. of concentrated hydrochloric acid is slowly added with stirring precipitating the diazonium salt. The diazonium salt suspension is then added to a solution of 16.2 g. (0.059 mole) of N,N,N',N'-tetramethyl-2-(1-naphthylamino)-1,3-propanediamine in 1 l. of ice water containing 25 ml. of concentrated hydrochloric acid. The deep purple mixture is allowed to stir for 3 hrs. and is made just neutral with ammonium hydroxide. The red dye is collected by filtration and dried. Crystallization of the crude dye from a 2-propanol-water mixture gives the desired p-{4-[2-dimethylamino-1-(dimethylaminomethyl)ethylamino] - 1 - naphthylazo}benzoic acid, dihydrochloride, of formula,

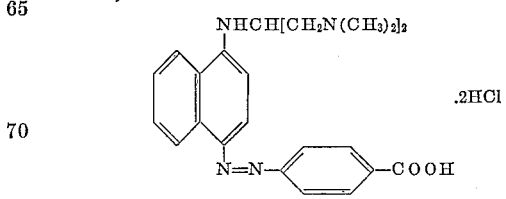

as red crystals, M.P. 195–197° C.

In like manner, the following related compounds can be prepared, starting from the appropriate substituted 1-naphthylamine and aromatic carbocyclic acid derivative:

o-[4-(2-diethylaminoethylamino)-1-naphthylazo]benzoic, acid, dihydrochloride, 1¼ hydrate, M.P. 162° C.
m-[4-(2-diethylaminoethylamino)-1-naphthylazo]benzoic acid, M.P. 202–203° C. (dec.)
p-[4-(2-diethylaminoethylamino)-1 - naphthylazo]benzoic acid, ¾ hydrate, M.P. 146–149° C.
4-{4-[3-(1-piperidinyl)propylamino]-1-naphthylazo} salicyclic acid, hemihydrate, M.P. 218–219° C. (dec.)
3-[4-(2-diethylaminoethylamino)-1-naphthylazo]-2-naphthoic acid, dihydrochloride, 1¼ hydrate, M.P. 176–178° C.
4-[4-(2-diethylaminoethylamino)-1-naphthylazo] phthalic acid, M.P. 190° C. (dec.)
5-{7-chloro-4-[(2-diethylaminoethyl)amino]-1-naphthylazo}isophthalic acid
4-{4-{[2-(2-piperidinoethylthio)ethyl]amino}-1-naphthylazo}-o-toluic acid.

N,N,N′,N′-tetramethyl-2-(1-naphthylamino)-1,3 - propanediamine, B.P. 137–138° C./0.3 mm., $n_D^{25}$ 1.5836, employed as a starting material in the above preparation, is prepared from 1-naphthol and 1,3-bis(dimethylamino)-2-propylamine according to the procedure outlined under Example 8 herein for the preparation of 1-(3-dimethylaminopropylamino)naphthalene. The other intermediate 1-naphthylamines employed herein can be prepared from the appropriate 1-naphthol or 1-naphthylamine precursors according to the procedures described under Examples 1 through 15.

*Example 20*

N′-(2-pyridyl)sulfanilamide (12.45 g., 0.05 mole) is diazotized and coupled into 13.4 g. (0.05 mole) of 1-[3-(1-naphthylamino)propyl]piperidine according to the procedure outlined under Example 7. Crystallization of the crude dye from dimethylacetamide gives the desired p - [4-(3-piperidinopropylamino)-1-naphthylazo] - N - 2-pyridylbenzenesulfonamide, of formula,

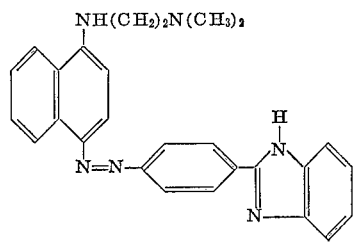

as dark orange crystals, M.P. 190–192° C.

Utilizing the general preparative methods described under Examples 1 through 15 herein, the following related compounds can be prepared, starting from the appropriate substituted 1-naphthylamine and aromatic amine:

p-[4-(2-diethylaminoethylamino) - 1 - naphthylazo]-N-2-quinoxalinylbenzenesulfonamide, hydrochloride, 2½ hydrate, M.P. 181–183° C.
p-[4-(2-diethylaminoethylamino) - 1 - naphthylazo-N-(2-pyrimidinyl)benzenesulfonamide, M.P. 215–217° C.
p-[4 - (3 - morpholinopropylamino)-1 - naphthylazo - N-2-pyridylbenzenesulfonamide, M.P. 240–241° C.
p-[4-(2-diethylaminoethylamino) - 1-naphthylazo] - N-2-pyridylbenzenesulfonamide, M.P. 164–165° C.
p-{4-[(2-diethylamino-1-methylethyl)amino]-1-naphthylazo}-N-(5-ethyl-1,3,4-thiadiazole-2-yl)benzenesulfonamide
1-[3-(1-naphthylamino) - propyl]piperidine, employed 1-naphthyl}amino}propyl}-2-methylpiperidine
p-{p-{4-{[3-(hexahydro-1-azepinyl)propyl]amino}-1-naphthylazo}phenylsulfonyl}phenol
p-{4-[(2-diethylamino-1-methylethyl)amino]-1-naphthylazo}-N-(5-ethyl-1,3,4 - thiadiazole-2-yl)benzenesulfonamide 1-[3-(1 - naphthylamino) - propyl]piperidine, employed as a starting material in the above procedure, is prepared as follows: N-(3-hydroxypropyl)-1-naphthylamine is allowed to react with hydrobromic acid according to the method outlined under Example 3 herein for the preparation of N-(2-bromoethyl)-1-naphthaylamine, hydrobromide. The intermediate N-(3-bromopropyl)-1-naphthylamine, hydrobromide, thus obtained melts at 152–154° C. This compound is subsequently allowed to react with piperidine according to the procedure described under Example 3 herein for the preparation of 1,1-diisopropyl-4-methyl-7-(1-naphthyl)diethylenetriamine to give the desired intermediate, 1-[3-(1-naphthylamino)propyl]piperidine, as off white crystals, M.P. 70–72° C.

The other intermediate 1-(dialkylaminoalkylamino)-naphthalenes employed herein can be prepared from the appropriate 1-naphthylamine or 1-naphthol according to the procedures described under Examples 1 through 15.

*Example 21*

2-(4-aminophenyl)benzimidazole (7.0 g., 0.033 mole) is diazotized and coupled into 7.07 g. (0.033 mole) of 1-(2 - dimethylaminoethylamino)naphthalene according to the procedure described under Example 7. Crystallization of the crude dye from ethanol gives the desired 2-{p-[4-(2-dimethylaminoethylamino) - 1 - naphthylazo]phenyl}benzimadazole, of formula

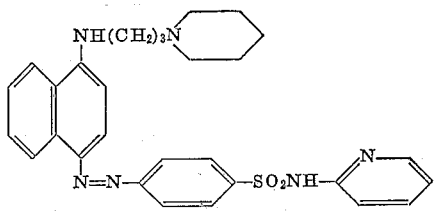

as a reddish-brown solid, M.P. 212–215° C.

Utilizing the preparative methods described under Examples 1 through 15 herein, the following related compounds can be prepared, starting from the appropriate substituted 1-naphthylamine and aromatic amine precursors:

2-{p-{4-[(2-diethylaminoethyl)amino] - 1 - naphthylazo}-phenyl}-6-methyl-benzothiazole
2 - {4 - [(3-diethylamino-2-methylpropyl)amino]-1-naphthylazo}-5-(6 - methyl - 2 - benzothiazolyl)benzenesulfonic acid
m-[4-(2-diethylaminoethylamino) - 1-naphthylazo]phenyl-2-thienyl ketone, dihydrochloride, M.P. 171–172° C.
N,N-diethyl-N′-{4-[p- (3-nitro-2-thienylsulfonyl - phenylazo]-1-naphthylethylenediamine, M.P. 173–175° C.
2-{p-[4-(2-diethylaminoethylamino) - 1 - naphthylazo]-phenyl}pyridine, M.P. 94–96° C.
2-{m - {4 - {[2 - (isopropylmethylamino)ethyl]amino}-1-naphthylazo}phenyl}indole
1-{2-{{4-[p-(4-methyl-2-oxazolyl)phenylazo] - 1 - naphthyl}amino}ethyl}hexamethyleneimine
2′-{p-{4-[(2-dimethylamino - 1 - methylethyl)amino]-1-naphthylazo}phenyl}-6-methyl-2,6′-bibenzothiazole $N^1,N^1$-dimethyl-$N^2$ - 1 - naphthylethylenediamine, B.P. 161–162° C./2.5 mm., $n_D^{25}$ 1.6118, employed as a starting material in the above procedure, is prepared from 1-naphthylamine and 2-dimethylaminoethyl chloride, hydrochloride, in accordance with the method set forth under Example 1 herein for the preparation of 1-(2-diethylaminoethylamino)naphthalene.

The other intermediate 1-(dialkylaminoalkylamino)-naphthalenes employed herein can be prepared from the appropriate 1-naphthol or 1-naphthylamine precursors according to the procedures described under Examples 1 through 15.

Example 22 m-amino-α-methylbenzyl alcohol (13.7 g., 0.1 mole) is diazotized and coupled into 35.4 g. (0.1 mole) of 4-(2 - diethylaminoethyl) - 1 - [2 - (1 - naphthylamino) ethyl]piperidine according to the procedure outlined under Example 3 herein. The product thus obtained, M.P. indefinite beginning at 65° C., is the desired m-{4-{2-[4-(2 - diethylaminoethyl)piperidino]ethylamino} - 1 - naphthylazo}-α-methylbenzyl alcohol, trihydrochloride, 2½ hydrate, of formula,

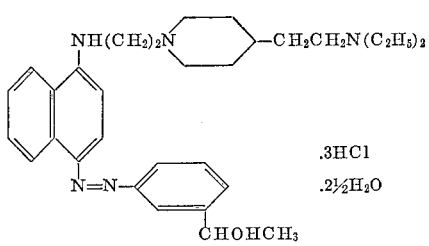

a hygroscopic, purple-black solid.

Utilizing the preparative methods described under Examples 1 through 15 herein, the following related compounds can be prepared, starting from the appropriate aromatic amine and the appropriate substituted 1-naphthylamine:

m-{4-{2-[4-(2-dimethylaminoethyl)piperidino] ethylamino}-1-naphthylazo}-α-methylbenzyl alcohol, trihydrochloride, hydrate, M.P. 150–160° C.

α-methyl-m-{4-{2-{4-[2-(1-pyrrolidinyl)ethyl] piperidino}ethylamino}-1-naphthylazo}benzyl alcohol, M.P. 120–123° C.

α-methyl-m-{4-{2-[4-(2-piperidinoethyl)piperidino] ethylamino}-1-naphthylazo}benzyl alcohol, M.P. 125–127° C.

α-methyl-m-{4-{2-[4-(2-morpholinoethyl)piperidino] ethylamino}-1-naphthylazo}benzyl alcohol, M.P. 143–145° C.

1-{3-{[4-(p-chlorophenylazo)-1-naphthyl]amino} propyl}-1'-methyl-4,4'-bipiperidine 3-{2-{[4-(p-isopropylphenylazo)-1-naphthyl]amino}-ethyl}-3-azabicyclo[3.3.1]nonane 2-{ethyl-{2-{1-{[4-(p-iodophenylazo)-1-naphthyl] amino}ethyl}-4-piperidinyl}ethyl}amino}ethanol 1'-{2-[(4-phenylazo-1-naphthyl)amino]ethyl}-1,4'-bipiperidine, M.P. 136–138° C.

4 - (2 - diethylaminoethyl) - 1 - [2 - (1 - naphthylamino)ethyl]piperidine, B.P. 208–209° C./0.2 mm., $n_D^{25}$ 1.5795, employed as a starting material in the above procedure, is prepared from N-(2-bromoethyl)-1-naphthylamine, hydrobromide and 4-(2-diethylaminoethyl)piperidine according to the method outlined under Example 3 herein for the preparation of 1,1-diisopropyl-4-methyl-7-(1-naphthyl)diethylenetriamine. The other substituted 1-naphthylamine intermediates employed herein can be prepared from the appropriate 1-naphthylamine or 1-naphthol compound according to the procedures described under Examples 1 through 15.

Example 23

4-amino-1-naphthoic acid, 2-diethylaminoethyl ester, dihydrochloride (8.6 g., 0.024 mole) is diazotized and coupled into 6.15 g. (0.024 mole) of 1-(3-dimethylamino-2,2-dimethylpropylamino)naphthalene according to the procedure described under Example 5 herein. The desired product, 4 - [4-(3-dimethylamino-2,2-dimethylpropylamino)-1-naphthylazo]-1-naphthoic acid, 2-diethylaminoethyl ester, trihydrochloride, dihydrate, of formula,

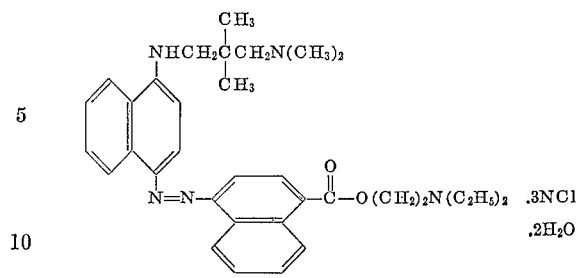

is thus obtained as a hygroscopic purple solid, M.P. 90° C. (dec.).

Utilizing the preparative methods under Examples 1 through 15 herein, the following related compounds can be prepared, starting from the appropriate substituted 1-naphthylamines:

4-[4-(2-diethylaminoethylamino)-1-naphthylazo] salicylic acid, 2-diethylaminoethyl ester, M.P. 87–89° C.

4-[4-(2-diethylaminoethylamino)-1-naphthylazo] salicylic acid, M.P. 200° C. (dec.)

2-chloro-4-[4-(2-diethylaminoethylamino)-1-naphthylazo]-N,N-dimethylbenzamide, monohydrate, M.P. 72–75° C.

p-[4-(2-diethylaminoethylamino)-1-naphthylazo] benzonitrile, M.P. 111–112° C.

{p-[4-(2-diethylaminoethylamino)-1-naphthylazo] phenyl}acetic acid, M.P. 187–189° C.

p-{4-{[2-(1-azaspiro[4.4]non-1-yl)ethyl]amino}-1-naphthylazo}benzoic acid, ethyl ester p-{4-[(2-dicyclohexylaminoethyl)amino]-1-naphthylazo}benzoic acid, dodecyl ester p-{4-[(2-diethylaminoethyl)amino]-1-naphthylazo} cinnamic acid 1 - (3 - dimethylamino - 2,2 - dimethylpropylamino) naphthalene, B.P. 142–143° C./0.75 mm. $n_D^{25}$ 1.5855, employed as a starting material in the above procedure, is prepared from β-dimethylaminopivaldehyde and 1-naphthylamine according to the procedure outlined under Example 4 herein for the preparation of N,N-diethyl-2,2-dimethyl-N'-1-naphthyl-1,3-propanediamine. The other intermediate 1 - (dialkylaminoalkylamino)naphthalenes employed herein can be prepared from the appropriate 1-naphthol or 1-naphthylamine precursors according to the procedures described under Examples 1 through 15.

Example 24 p-Chloroaniline (12.8 g., 0.1 mole) is diazotized and coupled into 40.9 g. (0.1 mole) of 4-[2-(1-naphthylamino)ethyl]-1-piperazineethanol, trihydrochloride, according to the procedure outlined under Example 7. Crystallization of the crude dye from 2-propanol gives the desired 4-{2-{[4-(p-chlorophenylazo)-1-naphthyl]amino} ethyl}-1-piperazineethanol, of formula

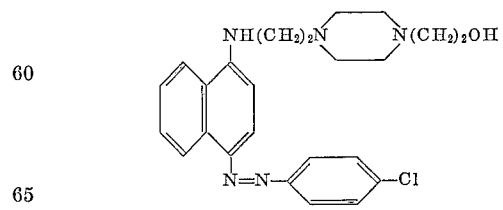

as orange-red platelets, M.P. 165–167° C.

Utilizing the preparative methods described under Examples 1 through 15 herein, the following related compounds can be prepared, starting from the appropriate aryl amine and substituted 1-naphthylamine precursors:

N'-[4-(o-chlorophenylazo)-1-naphthyl]-N,N-diethyl-ethylenediamine, M.P. 99–100° C.

N'-[4-(m-chlorophenylazo)-1-naphthyl]-N,N-diethyl-ethylenediamine, M.P. 63–64° C.

N'-[4-(p-chlorophenylazo)-1-naphthyl]-N,N-diethyl-
ethylenediamine, M.P. 94–95° C.

N'-[4-(3,5-dichlorophenylazo)-1-naphthyl]-N,N-diethyl-
ethylenediamine, M.P. 107–108° C.

N,N,2,2-tetramethyl-N'-[4-(2,4,5-trichlorophenylazo)-1-
naphthyl]-1,3-propanediamine, M.P. 165–166° C.

N'-[4-(4-chloro-1-naphthylazo)-1-naphthyl]-N,N-
diethylethylenediamine, M.P. 123–124° C.

N,N-diethyl-N'-[4-(o-fluorophenylazo)-1-naphthyl]ethyl-
enediamine, monohydrochloride, M.P. 94–96° C.

N,N-diethyl-N'-[4-(m-fluorophenylazo -1-naphthyl]ethyl-
enediamine, M.P. 66–68° C.

4-[2-(1-naphthylamino)ethyl]-1-piperazineethanol, tri-
hydrochloride, M.P. 207–211° C., employed as a starting
material in the above preparation is prepared from N-(2-
bromoethyl)-1-naphthylamine, hydrobromide, and 1-
piperazineethanol according to the procedure described
under Example 33 herein for the preparation of decahy-
dro-1-[2-(1-naphthylamino)ethyl]quinoline, hydrochlo-
ride. The other intermediate 1-naphthylamines employed
herein can be prepared from the appropriate 1-naphthol
or 1-naphthylamine precursors according to the pro-
cedures described under Examples 1 through 15.

Example 25

A filtered solution of 21.2 g. (0.07 mole) of tris (p-
ominophenyl)methanol in 43 ml. of concentrated hydro-
chloric acid and 800 ml. of water is cooled to 0° C. and
diazotized by the addition of 4.8 g. (0.07 mole) of sodium
nitrite in 50 ml. of water. After 10 minutes, the cold
diazonium salt solution is added slowly with stirring to a
solution of 16.8 g. (0.07 mole) of 1-(2-diethylamino-
ethylamino)naphthalene in 400 ml. of 95% ethanol while
maintaining the temperature at 0–5° C. The reaction
mixture is stirred for 2 hours in an ice bath and 2 hrs.
at room temperature. The reaction mixture is neutralized
with sodium acetate and stirred at room temperature
overnight. The red dye is collected by filtration, washed
thoroughly with water and dried in vacuo. Crystalliza-
tion from an ethanol-water mixture (decolorizing char-
coal) gives the desired bis(p-aminophenyl){p-[4-(2-di-
ethylaminoethylamino)-1-naphthylazo]phenyl}methanol,
of formula,

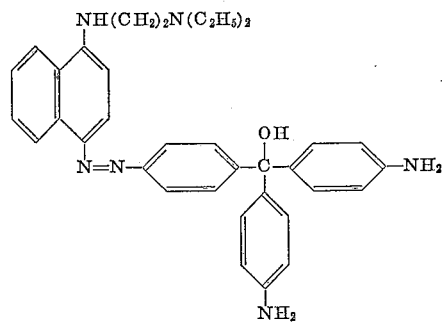

as a red powder, M.P. indefinite, beginning at 142–
146° C.

In a similar manner, the following related compounds
can be prepared, starting from the appropriate aromatic
amine and substituted 1-naphthylamine precursors:

N'-{4-[α,α-bis(p-aminophenyl)-p-tolylazo]-1-naphthyl}-
N,N-diethylethylenediamine
Bis(p-aminophenyl){p-{4-{[2-(isopropylmethylamino)
ethyl]amino}-1-naphthylazo}phenyl}methanol
(p-Aminophenyl){p-{4-[(2-diethylaminoethyl)amino]-1-
naphthylazo}phenyl}-4-amino-m-tolyl methanol
Bis(p-aminophenyl){p-{4-{[2,2-dimethyl-3-(1-pyrrol-
idinyl)propyl]amino}-1-naphthylazo}phenyl}methanol
Bis(p-aminophenyl){p-{4-[(2-diethylaminoethyl)amino]-
7-methoxy-1-naphthylazo}phenyl}methanol
Bis(p-aminophenyl)({p-{4-[(1-methyl-4-piperidyl)
amino]-1-naphthylazo}phenyl}methanol
Bis(p-aminophenyl){o-{4-[(2-diisopropylaminoethyl)
amino]-1-naphthylazo}phenyl}carbonium chloride, di-
hydrochloride
1-{2-{{4-[α,α-bis(p-aminophenyl)-α-hydroxy-p-tolylazo]-
1-naphthyl amino}ethyl}-3-piperidinol The other intermediate 1-naphthylamines employed
herein can be prepared from the appropriate 1-naphthol
or 1-naphthylamine precursors according to the proce-
dures described under Examples 1 through 15.

Example 26

3,5-dibromoaniline (28.7 g., 0.1 mole) is diazotized
and coupled into 24.4 g. (0.1 mole) of 1-(2-diethylamino-
ethylamino)naphthalene according to the procedure de-
scribed under Example 7. Crystallization of the crude
dye from ethanol gives the desired N'-[4-(3,5-dibromo-
phenylazo)-1-naphthyl]-N,N - diethylethylenediamine, of
formula,

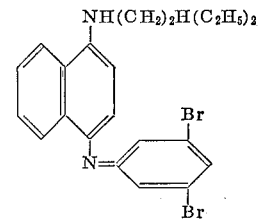

as maroon crystals, M.P. 110–112° C.

Utilizing the preparative methods described under Ex-
amples 1 through 15 herein, the following related com-
pounds can be prepared, starting from the appropriate
haloaniline compound and substituted 1-naphthylamine
precursors:

N'-[4-(o-bromophenylazo)-1-naphthyl] - N,N-di-n-prop-
ylethylenediamine
N'-[4-(m-bromophenylazo)-1-naphthyl] - N,N-diethyleth-
ylenediamine, dihydrochloride, sesquihydrate, M.P.
171–172° C.
4-(p-bromophenylazo)-N - (2-diethylaminoethyl)-1-naph-
thylamine, M.P. 85° C.
N'-[4-(4-bromo-2-chlorophenylazo) - 1 - naphthyl]-N,N-
diethylethylenediamine, M.P. 89–91° C.
N,N-diethyl-N'-[4-(p - fluorophenylazo)-1-naphthyl]eth-
ylenediamine, M.P. 70–72° C.
4-(o-iodophenylazo)-N-(2 - dimethylaminoethyl)-1-naph-
thylamine
4-(m-iodophenylazo) - N - (2-diisopropylaminoethyl)-1-
naphthylamine
4-(p-iodophenylazo) - N - (2-diethylaminoethyl)-1-naph-
thylamine The other substituted 1-naphthylamine intermediates
employed herein can be prepared from the appropriate
1-naphthylamine or 1-naphthol compound according to
the procedures described under Examples 1 through 15.

Example 27 p-Aminobenzanilide (10.6 g., 0.05 mole) is diazotized
and coupled into 11.4 g. (0.05 mole) of $N^1,N^1$-dimethyl-
$N^2$-1-naphthyl-1,2-propanediamine according to the pro-
cedure described under Example 15 herein. Crystalliza-
tion of the crude dye from 2-propanol gives red crystals
of the desired 4-{4-[(2-dimethylamino-1-methylethyl)
amino]-1-naphthylazo}benzanilide, of formula,

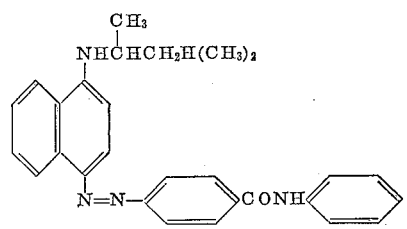

M.P. 156–160° C.

Utilizing the preparative methods described under Examples 1 through 15 herein, the following related compounds can be prepared, starting from the appropriate substituted 1-naphthylamine and aminocarbocyclic compound:

4'-[4-(2-diethylaminoethylamino) - 1-naphthylazo]acetanilide, M.P. 174–182° C.
3'-[4-(2-diethylaminoethylamino) - 1-naphthylazo]acetanilide, M.P. 168–169° C.
N-methyl-4'-{4-{[3 - (1 - pyrrolidinyl)propyl]amino}-1-naphthylazo}acetanilide
N-{4-[4-(2 - diethylaminoethylamino)-1-naphthylazo]-1-naphthyl}acetamide, M.P. 122–124° C.
N-{p-[4-(2 - diethylaminoethylamino)-1-naphthylazo]-β-hydroxy-α-(hydroxymethyl)phenethyl}acetamide, M.P. 173–174° C.
3'-{4-[(2 - diisopropylaminoethyl)amino]-1-naphthylazo}benzanilide
2-acetamido-5-{4-[(2 - diethylaminoethyl)amino]-7-methoxy-1-naphthylazo}benzenesulfonic acid
DL-threo-2,2 - dichloro-N-{p-{4-[(2 - diethylaminoethyl)amino]-1 - naphthylazo}-β-hydroxy-α-(hydroxymethyl)phenethyl}acetamide $N^1$, $N^1$-dimethyl-$N^2$-1-naphthyl - 1,2 - propanediamine, B.P. 118–120° C./0.2 mm., employed as a starting material in the above procedure, is prepared from 1-naphthylamine and 2-dimethylamino-1-methylethylchloride hydrochloride in accordance with the method set forth under Example 1 herein for the preparation of 1-(2-diethylaminoethylamino)naphthalene.

The other intermediate 1-(dialkylaminoalkylamino)-naphthalenes employed herein can be prepared from the appropriate 1-naphthol or 1-naphthylamine precursors according to the procedures described under Examples 1 through 15.

Example 28

A mixture of 13.8 g. (0.1 mole) of p-nitroaniline, 30 ml. of water and 30 ml. of concentrated hydrochloric acid is heated until solution is complete. The solution is cooled to room temperature with stirring and 80 g. of ice are added, followed by 6.9 g. (0.1 mole) of sodium nitrite in one portion with constant stirring. After most of the precipitate is dissolved, the diazonium salt solution is added with stirring at 0–5° C. to a solution of 24.2 g. (0.1 mole) of 1-(2-diethylaminoethylamino)naphthalene in 250 ml. of water, 250 ml. of 95% ethanol and 25 ml. of concentrated hydrochloric acid. The purple reaction mixture is stirred for 2 hrs. at 0–5° C., then for 2 hrs. at room temperature. The mixture is made alkaline with sodium hydroxide and the precipitate is collected by filtration, washed with water, and dried in vacuo. Crystallization of the crude dye from 2-propanol gives the desired N,N-diethyl-N'-[4 - (p-nitrophenylazo)-1-naphthyl] ethylenediamine, of formula

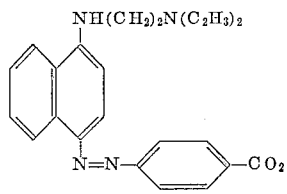

as purple-black crystals, M.P. 137–138° C.

In a similar manner, the following related compounds can be prepared, starting from the appropriate nitroaromatic carbocyclic amine and substituted 1-naphthalamine:

N,N-diethyl-N'-[4-(o-nitrophenylazo)-1-naphthyl]-ethylenediamine, M.P. 92–93° C.
N,N-diethyl-N'-[4-(m-nitrophenylazo)-1-naphthyl]-ethylenediamine, M.P. 117–118° C.
N,N-diethyl-N'-[4-(4-nitro-1-naphthylazo)-1-naphthyl]-ethylenediamine, M.P. 170–171° C.
N-isopropyl-N-methyl-N'-[4-(2-nitro-p-tolylazo)-1-naphthyl]ethylenediamine
$N^2$-[4-(2,4-dinitrophenylazo)-1-naphthyl]-$N^1$,$N^1$-dimethyl-1,2-propanediamine
5-nitro-2-4-[(3-piperidinopropyl)amino]-1-naphthylazo benzenesulfonic acid.
N,N-diethyl-2-methyl-N'-[4-(3-nitro-4-biphenylylazo)-1-naphthyl]-1,3-propanediamine
N-allyl-N-ethyl-N'-[4-(α,α,α-trifluoro-4-nitro-m-tolylazo)-1-naphthyl]ethylenediamine The other 1-naphthylamine intermediates employed herein can be prepared from the appropriate 1-naphthol or 1-naphthylamine compound according to the procedure described under Examples 1 through 15.

Example 29

N - (4 - amino - 1 - naphthyl) - N - (2 - diethylaminoethyl)-2,2,2-trifluoroacetamide, monohydrochloride (10.6 g., 0.027 mole) is diazotized and coupled into 5.2 g. (0.027 mole) of 1-(2-diethylaminoethylamino)benzene according to the procedure outlined under Example 1 herein. The intermediate trifluoroacetamide is not purified but is hydrolyzed directly to the desired N'-{p-[4-(2-diethylaminoethylamino) - 1 - naphthylazo]phenyl} - N,N-diethylethylenediamine, of formula,

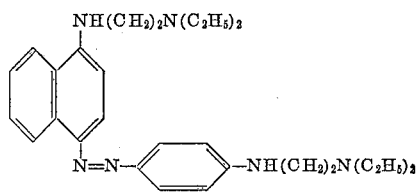

which is purified as the hydrated blue-purple trihydrochloride salt, M.P. 160–163° C.

Utilizing the preparative methods described under Examples 1 through 15 herein, the following related compounds can be prepared, starting from the appropriate arylamine and substituted 1-naphthylamine:

N'-[4-(p-aminophenylazo)-1-naphthyl]-N,N-diethylethylenediamine, trihydrochloride, hydrate
N'-[4-(p-dimethylaminophenylazo)-1-naphthyl]-N,N-diethylethylenediamine, trihydrochloride, hydrate, M.P. 150–153° C.
5-diethylamino-2-{4-[(2-diethylaminoethyl)amino]-1-naphthylazo}phenol, trihydrochloride
2-{4-[(2-diethylaminoethyl)amino]-1-naphthylazo}-5-[(2-diethylaminoethyl)methylamino]phenol, tetrahydrochloride
1-{3-{[4-(4-dimethylamino-1-naphthylazo)-1-naphthyl]-amino}propyl}piperidine, trihydrochloride
1-{p-{4-[(2-diethylaminoethyl)amino]-1-naphthylazo}-piperidine, trihydrochloride
5-[(2-diethylaminoethyl)amino]-2-{4-[(2-dimethylaminoethyl)amino]-1-naphthylazo}phenol, tetrahydrochloride
5-dimethylamino-2-{4-[(2,2-dimethyl-3-piperidinopropyl)amino]-1-naphthylazo}phenol, trihydrochloride The other substituted 1-naphthylamine precursors employed herein can be prepared from the appropriate 1-naphthylamine or 1-naphthol compound according to the procedures described under Examples 1 through 15.

Example 30

α,α,α-Trifluoro-m-toluidine (12.3 g., 0.0766 mole) is diazotized and coupled into 22.7 g. (0.0766 mole) of 1-[2,2-dimethyl-3-(1-naphthylamino)propyl]piperidine according to the procedure described under Example 7. Crystallization of the crude dye from 2-propanol gives the desired 1{2,2-dimethyl-3-{[4-(α,α,α-trifluoro-m-tolylazo)-1-naphthyl]amino}propyl}piperidine, of formula

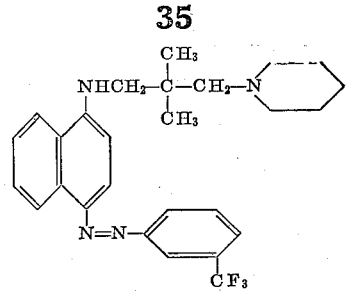

as red needles, M.P. 132–133° C.

Utilizing the preparative methods described under Examples 1 through 15 herein, the following related compounds can be prepared, starting from the appropriate arylamine and substituted 1-naphthylamine precursors:

N,N-diethyl-N'-[4-(α,α,α-trifluoro-m-tolylazo)-1-naphthyl]ethylenediamine, dihydrochloride, hydrate, M.P. 152–154° C.

N'-[4-(6-bromo-α,α,α-trifluoro-m-tolylazo)-1-naphthyl]-N,N-diethylethylenediamine, dihydrochloride, hydrate, M.P. 150–152° C.

N,N-diethyl-N'-[4-(α,α,α,α',α',α'-hexafluoro-3,5-xylylazo)-1-naphthyl]ethylenediamine, M.P. 89–90° C.

N,N-diisopropyl-N'-[4-(α,α,α-trifluoro-p-tolylazo)-1-naphthyl]ethylenediamine, dihydrochloride N,N-dimethyl-N'-[4-(α,α,α-trifluoro-o-tolylazo)-1-naphthyl]ethylenediamine, dihydrochloride p-{4-[(2-diethylaminoethyl)amino]-1-naphthylazo}benzenethiol 1-{2-{[4-(α-amino-p-tolylazo)-1-naphthyl]amino}ethyl}-3-piperidinol N,N-diethyl-N'-[4-(p-anilinophenylazo)-1-naphthyl]ethylenediamine N'-{5-chloro-2-{4-[(2-diethylaminoethyl)amino]-1-naphthylazo}-p-tolyl}-N,N-diethylethylenediamine 1-[2,2-dimethyl-3-(1-naphthylamino)propyl]piperidine, M.P. 76–77° C., employed as a starting material in the above procedure is prepared from β-piperidinopivaldehyde and 1-naphthylamine according to the procedure outlined under Example 4 herein for the preparation of N,N-diethyl-2,2-dimethyl-N'-1-naphthyl-1,3-propanediamine. The other substituted 1-naphthylamine intermediates employed herein can be prepared from the appropriate 1-naphthylamine or 1-naphthol compound according to the procedures described under Examples 1 through 15.

*Example 31*

2-(p-aminophenoxy)ethanol (15.3 g., 0.1 mole) is diazotized and coupled into 24.3 g. (0.1 mole) of 1-(2-diethylaminoethylamino)naphthalene according to the procedure described under Example 5 herein. Crystallization of the crude dye from methanol gives the desired 2-{p-[4-(2 - diethylaminoethylamino) - 1 - naphthylazo]phenoxy}ethanol, of formula,

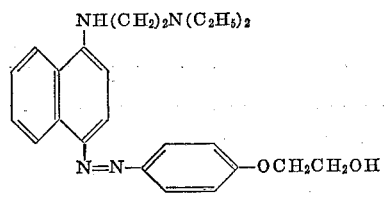

as red crystals, M.P. 99–101° C.

Utilizing the preparative methods described under Examples 1 through 15 herein, the following related compounds can be prepared, starting from the appropriate arylamine and substituted 1-naphthylamine precursors:

2-{p-{4-[(2-diethylaminoethyl)amino]-1-naphthylazo}phenylthio}ethanol

5-[4-(2-diethylaminoethylamino)-1-naphthylazo]-1-naphthol, dihydrochloride, 1¾ hydrate, M.P. 150–155° C. (dec.)

3-{p-{6-chloro-4-[(2-diethylaminoethyl)amino]-1-naphthylazo}phenoxy}-1,2-propanediol α-{{p-{6-bromo-4-[(2-diethylaminoethyl)amino]-1-naphthylazo}phenylthio}methyl}benzyl alcohol 2-{2-{2-{o-{4-[(2-diethylaminoethyl)amino]-1-naphthylazo}phenoxy}ethoxy}ethanol N'-{4-{p-[2-(2-ethoxyethoxy)ethoxy]phenylaxo}-1-naphthyl}-N,N-diethylethylenediamine 2-{2-{2-{p-{4-[(2-diethylaminoethyl)amino]-1-naphthylazo}phenoxy}ethoxy}ethoxy}ethanol 2,2'-{2-{4-[(2-diethylaminoethyl)amino]-1-naphthylazo}-p-phenylenedioxy}diethanol The other intermediate 1-(dialkylaminoalkylamino)naphthalenes employed herein can be prepared from the appropriate naphthalene compound according to the procedures described under Examples 1 through 15.

*Example 32* p-Phenylazoaniline (19.1 g., 0.1 mole) is diazotized and coupled into 24.2 g. (0.1 mole) of 1-(2-diethylaminoethylamino)naphthalene according to the procedure described under Example 7. Crystallization of the crude dye from ethanol gives the desired N,N-diethyl-N'-{4-[(p-phenylazo)phenylazo] - 1 - naphthyl}ethylenediamine, of formula,

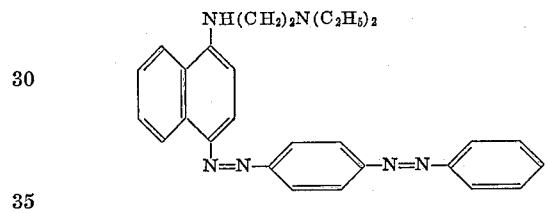

as dark green crystals, M.P. 120–122° C.

Utilizing the preparative methods described under Examples 1 through 15 herein, the following related compounds can be prepared, starting from the appropriate substituted 1-naphthylamine and aromatic amine precursors:

1-{2-{{4-[4-(p-bromophenylazo)-1-naphthylazo]-1-naphthyl}amino}ethyl}pyrrolidine p-{p-{4-{[2-(isopropylmethylamino)ethyl]amino}-1-naphthylazo}phenylazo}benezenesulfonic acid 5-{4-{4-{[2-(isopropylmethylamino)ethyl]amino}-1-naphthylazo}-1-naphthylazo}uracil p-{p-{4-[(2-diethylaminoethyl)amino]-1-naphthylazo}phenylazo}benzenesulfonic acid α-diethylamino-4-{4-{4-[(2-dimethylamino-1-methylethyl)amino]-1-naphthylazo}-1-naphthylazo}-o-cresol, trihydrochloride 1-{2,2-dimethyl-3-{{4-[4-(o-tolylazo)-o-tolylazo]-1-naphthyl}amino}propyl}piperidine m-{4-{4-[(3-diethylamino-2-hydroxypropyl)amino]-1-naphthylazo}-1-naphthylazo}-α-methylbenzyl alcohol p-{p-{4-{[2-(2-diethylaminoethoxy)ethyl]amino}-1-naphthylazo}phenylazo}benzenesulfonic acid The other intermediate 1-(dialkylaminoalkylamino)naphthalenes employed herein can be prepared from the appropriate 1-naphthol or 1-naphthylamine precursors according to the procedures described under Examples 1 through 15.

*Example 33*

Aniline (5.7 g., 0.062 mole) is diazotized and coupled into 20.7 g. (0.060 mole) of decahydro-1-[2-(1-naphthylamino)ethyl]quinoline, monohydrochloride, according to the procedure outlined under Example 5 herein. Crystallization of the crude dye from a methanol-water mixture gives the desired decahydro-1-[2-4-(phenylazo-1-naphthylamino)ethyl]quinoline, ¼ hydrate, as red crystals of formula,

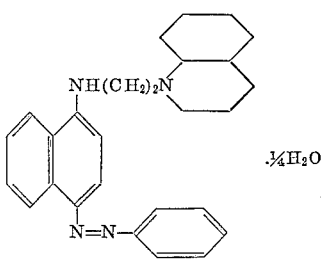

M.P. 60–70° C.

Utilizing the preparative methods described under Examples 1 through 15 herein, the following related compounds can be prepared, starting from the appropriately substituted aniline and 1-naphthylamine precursors:

1[2-(4-phenylazo-1-naphthylamino)ethyl]pyrrolidine, M.P. 82–83° C.

1-{2-[(4-phenylazo-1-naphthyl)amino]ethyl}-4-(1-pyrrolidinyl)piperidine, M.P. 162–164° C.

2-(2-methoxyethyl)-1-{2-[(4-phenylazo-1-naphthyl)amino]ethyl}piperidine

Hexahydro-1-{2-{[4-(3,5-xylylazo)-1-naphthyl]amino}ethyl}indoline

2-{2-{{4-[p-(3-diethylaminopropoxy)phenylazo]-1-naphthyl}amino}ethyl}decahydroisoquinoline 1-{{[4-(3,5-dichlorophenylazo)-1-naphthyl]amino}methyl}octahydro-1H-quinolizine Octahydro-1-{2-{{4-[m-(methylthio)phenylazo]-1-naphthyl}amino}ethyl}-1H-quinolizine 4'-{4-{[2-(hexahydrocyclopenta[c]pyrrol-2(1H)-yl)ethyl]amino}-1-naphthylazo}propiophenone Decahydro-1-[2-(1-naphthylamino)ethyl]quinoline, hydrochloride, employed as a starting material in the above preparation, is prepared from N-(2-bromoethyl)-1-naphthylamine, hydrobromide, and decahydroquinoline according to the following procedure: N-(2-bromoethyl)-1-naphthylamine, hydrobromide (173 g., 0.5 mole) is suspended in 500 ml. of concentrated ammonium hydroxide and the free base is extracted with several portions of xylene. The xylene extracts are dried over anhydrous sodium sulfate, the drying agent is removed by filtration, and the xylene solution is diluted to 750 ml. Decahydroquinoline (137.2 g., 1.0 mole) and 1.5 l. of xylene are added, and the mixture boiled under reflux for 12 hours. The reaction mixture is cooled, 1 l. of 50% aqueous sodium hydroxide is added, and the layers are separated. The xylene layer is washed successively with 10% sodium hydroxide solution and water and is dried over anhydrous sodium sulfate. The xylene is removed on the steam bath and the residue is distilled in vacuo to remove the excess decahydroquinoline. The residue is dissolved in 200 ml. of 2-propanol and the solution is treated with decolorizing charcoal followed by an excess of a 2-propanol-hydrogen chloride mixture. The precipitate which forms is collected by filtration, washed with 2-propanol, and crystallized from a methanol-2-propanol mixture. The colorless crystals thus obtained, M.P. 252–254° C., are the desired intermediate, decahydro-1-[2-(1-naphthylamino)ethyl]quinoline, monohydrochloride.

The other intermediate 1-naphthylamines employed herein can be prepared from the appropriate 1-naphthol or 1-naphthylamine precursors according to the procedures described under Examples 1 through 15.

Example 34

Aniline (18.6 g., 0.2 mole) is diazotized and coupled into 51.7 g. (0.2 mole) of 2-{ethyl[2-(1-naphthylamino)ethyl]amino}ethanol according to the procedure outlined under Example 3 herein. Crystallization of the crude dye from a methanol-ethyl acetate mixture gives the desired 2-{ethyl[2-(4-phenylazo-1-naphthylamino)ethyl]amino}ethanol, dihydrochloride, of formula,

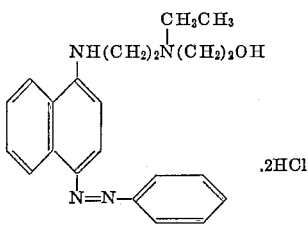

as a hydrated blue-green solid, M.P. 178–180° C.

Utilizing the preparative methods described under Examples 1 through 15 herein, the following related compounds can be prepared, starting from the appropriately substituted aniline and 1-naphthylamine precursors:

1-[2-(4-phenylazo-1-naphthylamino)ethyl]-3-piperidinol, M.P. 143–144° C.

2-{methyl[2-(4-phenylazo-1-naphthylamino)ethyl]amino}ethanol, dihydrochloride, hydrate, M.P. 190°–192° C.

1-[2-(4-phenylazo-1-naphthylamino)ethyl]-4-piperdinol, M.P. 166–167° C.

2,2'-[2-(4-phenylazo-1-naphthylamino)ethylimino]diethanol, dihydrochloride, ¼ hydrate, M.P. 155–156° C.

1-{2-[(4-phenylazo-1-naphthyl)amino]ethyl}-4-piperidinemethanol

2-{[2-{[4-(p-ethylphenylazo)-1-naphthyl]amino}ethyl]pentylamino}ethanol

1-{2-[(4-phenylazo-1-naphthyl)amino]ethyl}-4-piperidineethanol

2-{2-{ethyl{2-{[4-(α,α,α-trifluoro-m-tolylazo)-1-naphthyl]amino}ethyl}amino}ethoxy}ethanol 2-{ethyl{2-(1-naphthylamino)ethyl]amino}ethanol, B.P. 170–172° C./0.2 mm., $n_D^{25}$ 1.6109, employed as a starting material in the above procedure, is prepared from N-(2-bromoethyl)-1-naphthylamine, hydrobromide and N-ethylethanolamine according to the method described under Example 3 herein for the preparation of 1,1-diisopropyl-4-methyl-7-(1-naphthyl)diethylenetriamine. The other intermediate 1-(dialkylaminoalkylamino)naphthalenes employed herein can be prepared from the appropriate 1-naphthylamine or 1-naphthol according to the procedures described under Examples 1 through 15.

Example 35

Aniline (9.3 g., 0.1 mole) is diazotized and coupled into 25.4 g. (0.1 mole) of N-allyl-N-ethyl-N¹-1-naphthylethylenediamine according to the procedure outlined under Example 7 herein. Crystallization of the crude dye from 2-propanol gives the desired N-allyl-N-ethyl-N'-(4-phenylazo-1-naphthyl)ethylenediamine, of formula,

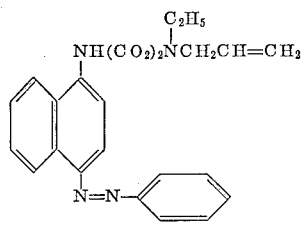

as shiny red plates, M.P. 62–63° C.

Utilizing the preparative methods described under Example 1 through 15 herein, the following related compounds can be prepared, starting from the appropriately substituted aniline and 1-naphthylamine precursors:

N-allyl-N-cyclohexyl-N'-(4-phenylazo-1-naphthyl)ethylenediamine, monohydrochloride, M.P. 215–216° C.

N,N-diallyl-N'-(4-phenylazo-1-naphthyl)ethylenediamine 1-(diallylamino)-3-[(4-phenylazo-1-naphthyl)amino]-2-propanol N-allyl-N'-(7-bromo-4-phenylazo-1-naphthyl)-N-methyl-
1,3-propanediamine
N,N-bis(2-methylallyl)-N'-(4-phenylazo-1-naphthyl)
ethylenediamine
N-allyl-N-ethyl-N'-(8-methyl-4-phenylazo-1-naphthyl)
ethylenediamine
N,N-diallyl-N'-(4-phenylazo-1-naphthyl)ethylene-
diamine
N-allyl-N'-(4-phenylazo-1-naphthyl)-N-propylethylene-
diamine N-allyl-N-ethyl - N$^1$- 1- naphthylethylenediamine, B.P. 147–148° C./0.07 mm., $n_D^{25}$ 1.5941, employed as a starting material in the above procedure, is prepared from N-(2-bromoethyl)-1-naphthylamine, hydrobromide, and allylethylamine according to the procedure described uder Example 3 herein for the preparation of 1,1-diisopropyl-4-methyl-7-(1-naphthyl)diethylenetriamine. The other intermediate 1-naphthylamines employed herein can be prepared from the appropriate 1-naphthol or 1-naphthylamine precursors according to the procedures described under Examples 1 through 15.

Example 36 p-Arsanilic acid (32.6 g., 0.15 mole) is diazotized and coupled into 36.4 g. (0.15 mole) of 1-(2-diethylaminoethylamino)naphthalene according to the procedure described under Example 1 herein. The desired p-[4-(2-diethylaminoethylamino)-1 - naphthylazo]benzenearsonic acid, of formula,

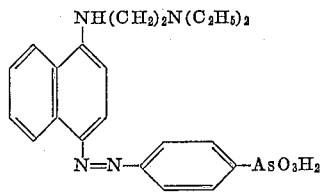

is obtained in free base form as a dark orange solid, M.P. 158° C. (dec.).

Utilizing the preparative methods described under Examples 1 through 15 herein, the following related compounds can be prepared, starting from the appropriate substituted 1-naphthylamine and aniline precursors:

{p-[4-(2-diethylaminoethylamino)-1-naphthylazo]
  phenyl}phosphoric acid, M.P. 225–226° C. dec.)
o-{4-{[2-(ethylmethylamino)ethyl]amino}-1-naphthyl-
  azo}benzenearsonic acid
2-hydroxy-4-{4-{[2-(1-methyl-2-pyrrolidinyl)ethyl]
  amino}-1-naphthylazo}benzenearsonic acid
p-{4-[(2-diethylaminoethyl)amino]-1-naphthylazo}
  benzenestibonic acid
2{{[4-(p-arsenosophenylazo)-1-naphthyl]amino}-
  methyl}-1-methylpyrrolidine
4-arsenoso-2-{4-[(2-piperidinoethyl)amino]-1-
  naphthylazo}phenol
{p-{7-bromo-4-{[2-(isopropylmethylamino)ethyl]
  amino}-1-naphthylazo}phenyl phosphoric acid
p-{4-[(3-dimethylamino-2-hydroxypropyl)amino]-1-
  naphthylazo}benzenearsonic acid The other intermediate 1-naphthylamines employed herein can be prepared from the appropriate 1-naphthol or 1-naphthylamine precursors according to the procedures described under Examples 1 through 15.

Example 37

Sulfanilic acid (5.4 g., 0.31 mole) is diazotized and coupled into 10.5 g. (0.31 mole) of N-[2-(2-diethylaminoethoxy)ethyl]-1-naphthylamine according to the procedure described under Example 1 herein. Crystallization of the crude product from dilute hydrochloric acid gives the desired p-{4-[2-(2-diethylaminoethoxy)ethylamino]-1-naphthylazo}benzenesulfonic acid, monohydrochloride, of formula,

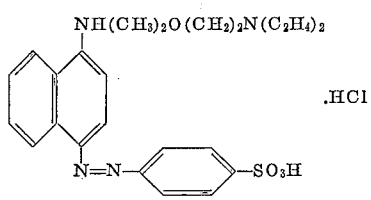

as a hydrated blue-green solid, M.P. 195–198° C.

Utilizing the preparative methods described under Examples 1 through 15 herein, the following related compounds can be prepared, starting from the appropriate aniline and 1-naphthlyamine derivate:

N-[2-(2-diethylaminoethoxy)ethyl]-4-phenylazo-
  1-naphthylamine, dihydrochloride, hydrate,
  M.P. 95–100° C.
N'-[4-(p-chlorophenylazo)-1-naphthyl]tetrahydro-
  N,N-dimethyl-2,5-furanbis(methylamine), dihy-
  drochloride
p-{4-{[2-(2-(2-diethylaminoethoxy)ethoxy)ethyl]
  amino}-1-naphthylazo}benzenesulfonic acid
1-{2-{2-{[4-(α,α,α-trifluoro-m-tolylazo)-1-naphthyl]
  amino]ethoxy}ethyl}piperidine
N[3-(3-diethylaminopropoxy)propyl]-4-[p-(p-nitro-
  phenylsulfonyl)phenylazo]-1-naphthylamine
N-{p-{4-{[5-(dimethylaminomethyl)tetrahydro-
  ifurfuryl]amino}-1-naphthylazo}-β-hydroxy-2-
  methylphenethyl}acetamide
4-(p-cumenylazo)-N-[2-(2-dibutylaminoethoxy)
  ethyl]-1-naphthylamine
4-(8-chloro-1-naphthylazo)-N-[2-(2-diethylamino-1-
  methylethoxy)ethyl]-1-naphthylamine N - [2-(2-diethylaminoethoxy)ethyl]-1-naphthylamine, B.P. 160–161° C./0.3 mm., $n_D^{25}$ 1.5533, employed as a starting material in the above procedure, is prepared from 1 - naphthylamine and 2 - (2-diethylaminoethoxy) ethylchloride, hydrochloride in accordance with the method set forth under Example 7 herein for the preparation of N,N,2 - trimethyl - N'-1-naphthyl-1,3-propanediamine. The other intermediate 1-(dialkylaminoalkylamino)naphthalenes employed herein can be prepared from the appropriate 1-naphthol or 1-naphthylamine precursors according to the procedures described under Examples 1 through 15.

Example 38

Aniline (9.3 g., 0.1 mole) is diazotized and coupled into 27.9 g. (0.1 mole) of 1-methyl-4-[2-(1-naphthylamino)ethyl]piperazine according to the procedure described under Example 3 herein. The crude dye is crystalized from 4 N hydrochloric acid to give the desired 1-methyl - 4-[2-(4-phenylazo-1-naphthylamino)ethyl]piperazine, trihydrochloride, of formula,

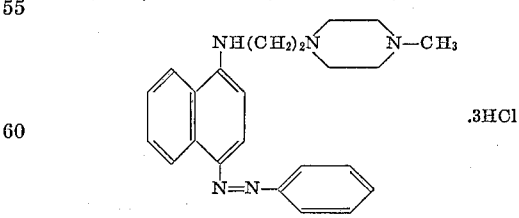

as a dark blue-green hydrated solid, M.P. 153–155° C.

Utilizing the preparative methods described under Examples 1 through 15 herein, the following related compounds can be prepared, starting from the appropriate aromatic amine and 1-naphthylamine derivative:

1-[2-(4-phenylazo-1-naphthylamino)ethyl]piper-
  zine, monohydrochloride, M.P. 218–220° C.
m-{4-{[2-(4-methyl-1-homopiperazinyl)ethyl]amino}-
  1-naphthylazo}benzoic acid
1-{3-{[4-(p-chlorophenylazo)-1-naphthyl]amino}
  propyl}-4-(3-diethylaminopropyl)piperazine 4-{2-{[4-(α,α,α-trifluoro-p-tolylazo)-1-naphthyl]amino}
ethyl}-1-piperazineethanol
p{4-{{2-[4-(2-diethylaminoethyl)-1-piperazinyl]ethyl}
amino}-1-naphthylazo}benzenesulfonic acid,
1-butyl-4-{2-{[4-(6-methylthio-1-naphthylazo)-1-
naphthyl]amino}ethyl}piperazine
1-methyl-4-{2-{methyl{2-[(4-phenylazo-1-naphthyl)-
amino]ethyl}amino}ethyl}piperazine
1-{2-{[4-(4-bromo-1-naphthylazo)-1-naphthyl]amino}-
ethyl}-4-ethylhomopiperazine 1 - methyl-4-[2-(1-naphthlamino)ethyl]piperazine, B.P. 163–165° C./0.2 mm., M.P. 58–60° C., employed as a starting material in the above procedure, is prepared from N-(2-bromoethyl)-1-naphthylamine, hydrobromide, and 1-methylpiperazine according to the procedure outlined under Example 3 herein for the preparation of 1,1-dissopropyl-4-methyl - 7 - (1-naphthyl)diethylenetriamine. The other intermediate 1-(dialkylaminoalkylamino)naphthalenes employed herein can be prepared from the appropriate napthalene precursor according to the procedures described under Examples 1 through 15.

*Example 39*

5,6,7,8-tetrahydro-1-naphthylamine (14.7 g., 0.1 mole) is diazotized and coupled into 24.3 g. (0.1 mole) of 1 - (2-diethylaminoethylamino)naphthalene according to the procedure described under Example 7 herein. Crystallization of the crude product from ethanol gives the desired N,N-diethyl-N'-[4-(5,6,7,8-tetrahydro-1-naphthylazo)-1-naphthyl]ethylenediamine, of formula,

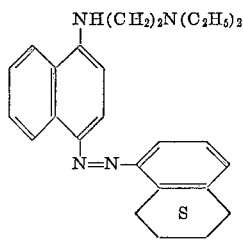

as shiny red crystals, M.P. 108–110° C.

Utilizing the preparative methods described under Examples 1 through 15 herein, the following related compounds can be prepared starting from the appropriate aromatic carbocyclic amine and 1-naphthylamine precursors:

N,N-diethyl-N'-[4-(1-indanylazo)-1-naphthyl]ethylenediamine
N'[4-(4-chloro-5,6,7,8-tetrahydro-1-naphthylazo)-1-naphthyl]-N,N-diethyl-1,3-propanediamine
1-{2-{[4-(5,6-dihydro-1-naphthylazo)-1-naphthyl]amino}ethyl}pyrrolidine
N-isopropyl-N-methyl-N'[4-(5,6,7,8-tetrahydro-1-naphthylazo)-1-naphthyl]ethylendiamine
N'-[4-(5,8-dihydro-1-naphthylazo)-1-naphthyl]-N,N-diethylethylenediamine
N'-[4-(4-bromo-5,6,7,8-tetrahydro-1-naphthylazo)-7-methoxy-1-naphthyl]-N,N-dimethylethylenediamine
N,N-diethyl-N'-[4-(5-indanylazo)-1-naphthyl]-2,2-dimethyl-1,3-propanediamine
4-{4-[(2-diethylaminoethyl)amino]-1-naphthylazo}-1-indanone
6-{4-[(2-diisopropylaminoethyl)amino]-1-naphthylazo}-1-indanone The other intermediate 1 - (dialkylaminoalkylamino) naphthalenes employed herein can be prepared from the appropriate 1-naphthol or 1-naphthylamine precursors according to the procedures described under Examples 1 through 15.

*Example 40*

Aniline (18.6 g., 0.2 mole) is diazotized and coupled into 42.7 g. (0.2 mole) of 1-(5-diethylaminopentylamino) naphthalene according to the procedure described under Example 6 herein. The desired N,N - diethyl - N'-(4-phenylazo-1-naphthyl)cadaverine, dihydrochloride, of formula,

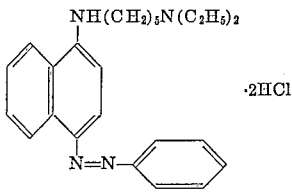

is obtained as hydrated, greenish-brown irridiscent crystals, M.P. 180–182° C.

Utilizing the preparative methods described in Examples 1 through 15 herein, the following related compounds can be prepared, starting from the appropriate arylamine and substituted 1-naphthylamine precursors:

N'-[4-(4'-chloro-4-biphenylylazo)-1-naphthyl]-N,N-diethyl-1,4-cyclohexanebis(methylamine)
1-{6-{{4-(p-phenoxyphenylazo)-1-naphthyl}amino}hexyl} pyrrolidine
N'-{4-[2,5-bis(2-ethoxyethoxy)phenylazo]-1-naphthyl}-N-isopropyl-N-methyl-1,6-hexanediamine
p-{4-{[2-(dimethylaminomethyl)cyclohexyl]amino}-1-naphthylazo}-N,N-diethylbenzenesulfonamide
m-{4-[(8-diethylaminooctyl)amino]-1-naphthylazo}benzonitrile
3-{4-[(3-diethylaminocyclohexyl)amino]-1-naphthylazo}-5,6,7,8-tetrahydro-2-naphthalenesulfonic acid
2-{p-{4-{[2-(2-diethylaminoethyl)cyclopentyl]amino}-1-naphthylazo}phenyl}quinoline
N,N-diethyl-2-{[4-(p-2-thienylphenylazo)-1-naphthyl] amino}cyclohexanemethylamine
5-{4-[(4-diethylamino-1-isobutylbutyl)amino]-1-naphthylazo}isophthalic acid, dimethyl ester 1-(5-diethylaminopentylamino)naphthalene, B.P. 198–200° C./1.8 mm., $n_D^{24.5}$ 1.5740, employed as a starting material for the above procedure, can be prepared from 1-naphthylamine and 5-diethylaminopentylchloride hydrochloride in accordance with the method set forth under Example 1 herein for the preparation of 1-(2-diethylaminoethylamino)naphthalene. Other intermediate 1-(dialkylaminoalkylamino)naphthalenes can be prepared from a 1-naphthylamine or 1-naphthol compound according to the procedures outlined in Examples 1 through 15 herein.

*Example 41* p-(2-diethylaminoethoxy)aniline (13.5 g., 0.065 mole) is diazotized and coupled into 15.8 g. (0.065 mole) of 1 - (2-diethylaminoethylamino)naphthalene according to the procedure described under Example 3 herein. The desired N' - {4-[p-(2-diethylaminoethoxy)phenylazo]-1-naphthyl}-N,N - diethylethylenediamine, trihydrochloride, of formula,

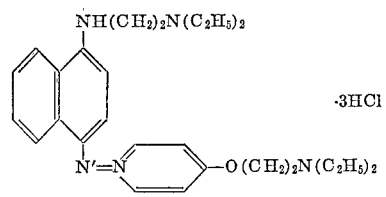

is obtained as a dark blue hydrated solid, M.P. 170–173° C.

Utilizing the preparative methods described under Examples 1 through 15 herein, the following related compounds can be prepared, starting from the appropriate arylamine and substituted 1-naphthylamine precursors:
N'-{4-[p-2-diethylaminoethoxy)phenylazo]-1-naphthyl}-
N,N-diisopropylethylenediamine, trihydrochloride, monohydrate, M.P. 96–103° C.
3-{{4-[p-(2-diethylaminoethylthio)phenylazo]-1-naphthyl}amino}-1-methylpiperidine, trihydrochloride N'-{4-[p-(2-diethylaminoethylsulfinyl)phenylazo]-8-methoxy-1-naphthyl}-N,N-diethylethylenediamine, trihydrochloride 3-diethylamino-4'-{4-{[2-(ethylmethylamino)ethyl]amino}-1-naphthylazo}propiophenone, trihydrochloride 1-{2-{{4-[p-(2-diethylaminoethylsulfonyl)phenylazo]-1-naphthyl}amino}ethyl}piperidine, trihydrochloride N'-{8-chloro-4-[p-(3-diethylaminopropyl)phenylazo]-1-naphthyl}-N,N-diethylethylenediamine, trihydrochloride N-butyl-N'-{p-{4-[(2-diethylaminoethyl)amino]-1-naphthylazo}phenylsulfonyl}urea 1-{3-{p-{5-bromo-4-[(2-diethylaminoethyl)amino]-1-naphthylazo}phenoxy}propyl}piperidine, trihydrochloride The other intermediate 1-(dialkylaminoalkylamino)-naphthalenes employed herein can be prepared from the appropriate naphthalene compound according to the procedures described under Examples 1 through 15.

*Example 42*

Sulfanilic acid (8.7 g., 0.05 mole) is diazotized and coupled into 12.2 g. (0.05 mole) of 1-(2-isopropylmethylaminoethylamino)naphthalene according to the procedure described under Example 1 herein. The desired p-{4-[2-(isopropylmethylamino)ethylamino]-1-naphthylazo}benzenesulfonic acid, monohydrochloride, of formula,

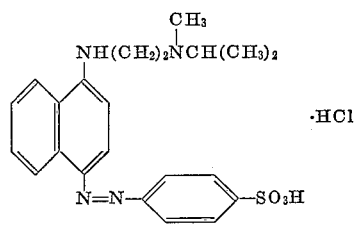

is obtained as a dark maroon powder, M.P. indefinite beginning at 200° C. (dec.). The free base melts at 244° C. (dec.).

Utilizing the preparative methods described under Examples 1 through 15 herein, the following related compounds can be prepared, starting from the appropriate aromatic amine and 1-naphthylamine derivative:

3-{4-[(2-dimethylaminoethyl)amino]-1-naphthylazo}-2,7-naphthalenedisulfonic acid
1-{4-(2-piperidinoethylamino)-1-naphthylazo}-2-naphthol-4-sulfonic acid
1-{4-{[1-methyl-2-(1-pyrrolidinyl)ethyl]amino}-1-naphthylazo}-2,7-naphthalenedisulfonic acid
5-{4-{[2-(1-pyrrolidinyl)propyl]amino}-1-naphthylazo}-1-naphthalenesulfonic acid
2-acetamido-5-{p-{4-[(2-diethylaminoethyl)amino]-1-naphthylazo}phenylsulfonyl}thiazole
m-{6-chloro-4-{[2-(ethylisopropylamino)ethyl]amino}-1-naphthylazo}-α-methylbenzyl alcohol, dihydrochloride
N⁴-(6-chloro-4-phenylazo-1-naphthyl)-N¹,N¹-diethyl-1,4-pentanediamine, dihydrochloride 1-(2-diethylaminoethylamino)-7-methoxynaphthalene, B.P. 170–173° C./0.7 mm., $n_D^{25}$ 1.5875, employed as a starting material for the above procedure, can be prepared from 7-methoxy-1-naphthylamine and 2-diethylaminoethylchloride hydrochloride in accordance with the method set forth under Example 1 herein for the preparation of 1-(2-diethylaminoethylamino)naphthalene. The other intermediate 1-naphthylamine compounds can be prepared according to the methods outlined under Examples 1 through 15 herein.

*Example 43*

N-[5-(p-aminophenoxy)pentyl]phthalimide (11.3 g., 0.035 mole) is diazotized and coupled into 8.4 g. (0.035 mole) of 1-(2-diethylaminoethylamino)naphthalene in an ethanol-water mixture according to the procedure outlined under Example 7 herein. Crystallization of the crude dye from 2-propanol gives the desired N-{5-{p-[4-(2-diethylaminoethylamino)-1-naphthylazo]phenoxy}pentyl}phthalimide, of formula,

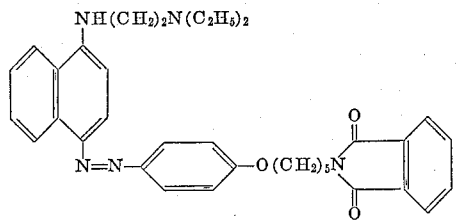

as shiny orange crystals, M.P. 94–98° C.

Utilizing the preparative methods described under Examples 1 through 15 herein, the following related compounds can be prepared, starting from the appropriate arylamine and substituted 1-naphthylamine precursors:

4'-{7-{p-{4-{[2-(isopropylmethylamino)ethyl]amino}-1-naphthylazo}phenoxy}heptyloxy}acetanilide
N'-{4-{p-{7-(p-aminophenoxy)heptyloxy}phenylazo}-1-naphthyl}-N,N-diethyl-2,2-dimethyl-1,3-propanediamine
4'-{7-{p-{4-[(2-diethylaminoethyl)amino]-7-methoxy-1-naphthylazo}phenoxy}heptyloxy}propionanilide
N,N-diethyl-N'-{4-{p-(7-methoxyhepyloxy)phenylazo}-1-naphthyl}1,1-cyclohexanebis(methylamine)
1-{2-{{4-{p-[7-(p-dimethylaminophenoxy)heptyloxy]phenylazo}-1-naphthyl}amino}ethyl}pyrrolidine
N-{5-{4-{4-[(2-diisopropylaminoethyl)amino]-1-naphthylazo}-2-methoxyphenoxy}pentyl}benzamide
2-{5-{p-{4-[(1-ethyl-4-piperidyl)amino]-1-naphthylazo}phenoxy}pentyl}-1,2-benzisothiazolin-3
N-{5-{p-{4-[(2-diethylaminoethyl)amino]-1-naphthylazo}phenoxy}pentyl}benzenesulfonamide The other intermediate 1-(dialkylaminoalkylamino)-naphthalenes employed herein can be prepared from the appropriate naphthalene compound according to the procedures described under Examples 1 through 15.

*Example 44*

To a benzene solution of 11.4 g. (0.05 mole) of antimony (III) chloride is added dropwise with vigorous stirring a solution of 8.65 g. (0.025 mole) of N,N-diethyl-N'-(4-phenylazo-1-naphthyl)ethylenediamine in benzene. The purple solid that precipitates is collected by filtration and dried in vacuo. The compound is equilibrated in air overnight. This is the desired N,N-diethyl-N'-(4-phenylazo-1-naphthyl)ethylenediamine, complex with 2 f. wt. antimony (III) chloride, sesquihydrate, of formula,

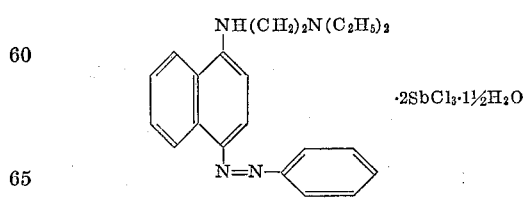

M.P. 156–160° C.

*Example 45*

Aniline (9.3 g., 0.1 mole) is diazotized and coupled into 29.3 g. (0.1 mole) of 3-{2-[(1-naphthyl)amino]ethyl}-3-azabicyclo[3.2.2]nonane according to the procedure described under Example 7 herein. Crystallization of the crude dye from ethyl acetate gives the desired 3-{2-[(4-phenylazo-1-naphthyl)amino]ethyl}-3-azabicyclo[3.2.2]nonane, of formula

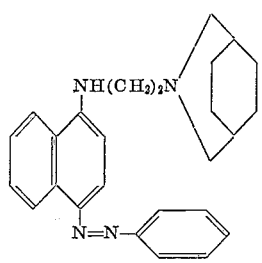

as shiny, orange-red plates, M.P. 162–164° C.

Utilizing the preparative methods described under Examples 1 through 15 herein, the following related compounds can be prepared, starting from the appropriate arylamine and substituted 1-naphthylamine precursors:

2-{2-{[4-(p-cyclohexylphenylazo)-1-naphthyl]amino}ethyl}-1-methylpiperidine
Hexahydro-1-{[(4-phenylazo-1-naphthyl)amino]methyl}-1H-pyrrolizine
2-{3-{{4-[o-(ethylsulfonyl)phenylazo]-1-naphthyl}amino}propyl}-1-methylpiperidine
p-{4-{[2-(1-propyl-2-pyrrolidinyl)ethyl]amino}-1-naphthylazo}benzyl alcohol
4-{4-{[3-(1-methyl-3-piperidyl)propyl]amino}-1-naphthylazo}carbanilide
1-butyl-2-{2[(4-phenylazo-1-naphthyl)amino]ethyl}piperidine
4'-{4-{[3-(1-methyl-2-pyrroylidinyl)propyl]amino}-1-naphthylazo}thioacetophenone
1-methyl-4-{3-{[4-(α-phenyl-p-tolylazo)-1-naphthyl]amino}propyl}piperidine 3-{2-[(1-naphthyl)amino]ethyl}-3-azabicyclo[3.2.2]nonane, employed as a starting material in the above procedure, is prepared from N-(2-bromoethyl)-1-naphthylamine, hydrobromide, and 3-azabicyclo[3.2.2]nonane according to the procedure outlined under Example 3 herein for the preparation of 1,1-diisopropyl-4-methyl-7-(1-naphthyl)diethylenetriamine. The other intermediate 1-(dialkylaminoalkylamino)naphthalenes employed herein can be prepared from the appropriate naphthalene precursor according to the procedures described under Examples 1 through 15.

*Example 46* m-Aminobenzylalcohol (10.0 g., 0.08 mole) is diazotized and coupled into 22.9 g. (0.08 mole) of 1-[2,2-dimethyl-3-(1-naphthylamino)propyl]pyrrolidine according to the procedure described under Example 5 herein. Crystallization of the crude dye from 2-propanol gives the desired m-{4-[2,2-dimethyl-3-(1-pyrrolidinyl)propylamino]-1-naphthylazo}benzyl alcohol, of formula,

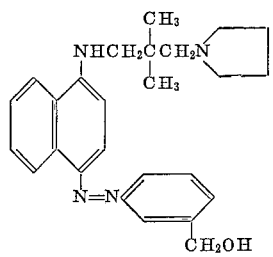

as red crystals, M.P. 101–103° C.

Utilizing the preparative methods described under Examples 1 through 15 herein, the following related compounds can be prepared, starting from the appropriate arylamine and substituted 1-naphthylamine precursors:

o-{4-{[2-(hexahydro-2-methyl-1-azepinyl)ethyl]amino}-1-naphthylazo}-phenethyl alcohol 1-{2-{4-[p-(2-acetamido-5-thiazolylthio)phenylazo]-1-naphthylamino}ethyl}-3,3-dimethylpiperidine
2-{2-{{4-[p-(ethylsulfonyl)phenylazo]-1-naphthyl}amino}ethyl}octahydro-1H-pyrido[1,2-c]pyrimidine
1-{2-{[4-(p-2-furoylphenylazo)-1-naphthyl]amino}ethyl}-2,5-dimethyl-pyrrolidine
m-{4-{[2-(octahydro-2H-pyrido[1,2]pyrazin-2-yl)ethyl]amino}-1-naphthylazo}benzonitrile
{p-{4-[(2,3-dipiperidinopropyl)amino]-1-naphthylazo}phenyl}-1,2-ethanediol
p-{4-{{2-[2-(2-piperidinoethyl)piperidino]ethyl}amino}-1-naphthylazo}-N-(2-pyridyl)benzenesulfonamide, N-1-oxide
3-methyl-1-{2-{{4-[p-(2-pyridyl)phenylazo]-1-naphthyl}amino}ethyl}piperidine, 1'-oxide 1 - [2,2 - dimethyl-3-(1-naphthylamino)propyl]pyrrolidine, M.P. 57–58° C., is prepared from β-pyrrolidinylpivaldehyde and 1-naphthylamine according to the method described under Example 4 herein for the preparation of N,N - diethyl - 2,2-dimethyl-N'-1-naphthyl-1,3-propanediamine. The other intermediate 1-(dialkylaminoalkylamino)naphthalenes can be prepared from the appropriate 1-naphthol or 1-naphthylamine precursor according to the procedures outlined in Examples 1 through 15 herein.

We claim:
1. A member of the group consisting of a free base of the formula

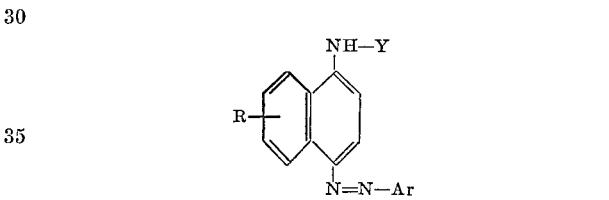

and non-toxic acid addition salts thereof, wherein:
R is a member of the group consisting of hydrogen, methyl, lower alkoxy and halogen;
Ar is a member of the group consisting of benzene, naphthalene, dihydronaphthalene, tetrahydronaphthalene and indane radicals, said radicals being free of nuclear hydroxy groups and nuclear sulfamyl groups;
And Y is a member of the group consisting of

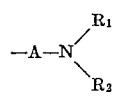

and

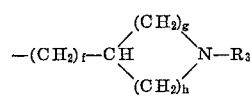

wherein
A is a member of the group consisting of 2 to 8 carbon alkylene and 3 to 6 carbon alkylene replaced in one of its non-terminal methylene groups by one of —O—, —S—, =CHOH, =C(OH)lower alkyl, =N(lower alkyl) and =CH[di(lower)alkylaminoalkyl]
$R_1$ and $R_2$ each represent a member of the group consisting of
(1) fewer than 7 carbon alkyl, alkoxyalkyl, hydroxyalkyl and cycloalkyl
(2) allyl and methallyl
(3) 3 to 7 carbon dialkylaminoalkyl, and (4) as further members including the adjacent nitrogen atom
  piperidino
  pyrrolidino
  morpholino
  hexahydroazepinyl
  hexamethyleneimino
  azaspirodecyl
  azaspiroundecyl
  azabicyclononyl
  azaspirononyl
  hexahydroindolinyl
  decahydroquinolinyl
  decahydroisoquinolinyl
  hexahydrochlopenta[c]pyrrolyl
  piperazinyl
  homopiperazinyl
  octahydropyridopyrimidinyl
  octahydropyridopyrazinyl and
  lower alkyl, lower hydroxyalkyl
  lower alkoxyalkyl, hydroxy and
  lower dialkylaminoalkyl substituted derivatives thereof
$f$ is a numeral from 0 to 3
$g$ and $h$ are integers whose sum is from 3 to 4 and
$R_3$ is a member of the group consisting of
  lower alkyl, lower hydroxyalkyl
alkoxyalkyl and lower dialkylaminoalkyl.

2. p - {4 - [2-(isoprophylmethylamino)-ethylamino]-1-naphthylazo}-benzenesulfonic acid, monohydrochloride.

3. N' - {4 - [p - (2-diethylaminoethoxy)-phenylazo]-1-naphthyl}-N,N-diethylethylenediamine, trihydrochloride.

4. Bis - (p - aminophenyl)-{p-[4-(2-diethylaminoethylamino)-1-naphthylazo]-phenyl}-methanol.

5. m - [4 - (2 - diethylaminoethylamino)-1-naphthylazo]-α-methylbenzyl alcohol, dihydrochloride.

6. p - [4 - (3-diethylamino-2,2-dimethylpropylamino)-1-naphthylazo]-benzenesulfonic acid, sesquihydrochloride.

References Cited by the Examiner

UNITED STATES PATENTS 2,238,485  4/1941  Dickey et al. _____ 260—205
3,139,421  6/1964  Elslager et al. _____ 260—154

OTHER REFERENCES

Conant: "The Chemistry of Organic Compounds," rev. ed., New York, Macmillan, 1939, p. 150.

Kyosuke Tsuda et al.: Chem. Abstracts, vol. 45, page 4215 (1951), vol. 45, page 6800 (1951).

Negoro, H.: Chem. Abstracts, vol. 47, page 1009 (1953).

CHARLES B. PARKER, *Primary Examiner.*